(12) United States Patent
Koc et al.

(10) Patent No.: US 8,719,324 B1
(45) Date of Patent: May 6, 2014

(54) SPECTRAL MODULAR ARITHMETIC METHOD AND APPARATUS

(76) Inventors: Cetin K. Koc, Corvallis, OR (US); Gokay Saldamli, Richmond (CA)

( * ) Notice: Subject to any disclaimer, the term of this patent is extended or adjusted under 35 U.S.C. 154(b) by 1799 days.

(21) Appl. No.: 11/413,686

(22) Filed: Apr. 28, 2006

Related U.S. Application Data

(60) Provisional application No. 60/676,108, filed on Apr. 28, 2005, provisional application No. 61/731,142, filed on Oct. 28, 2005.

(51) Int. Cl.
*G06F 7/38* (2006.01)

(52) U.S. Cl.
USPC .......................................................... 708/491

(58) Field of Classification Search
USPC .................................................. 708/491, 492
See application file for complete search history.

(56) References Cited

U.S. PATENT DOCUMENTS

| | | | | |
|---|---|---|---|---|
| 4,181,968 | A * | 1/1980 | Johnson | 708/603 |
| 5,751,808 | A * | 5/1998 | Anshel et al. | 713/168 |
| 7,069,287 | B2 * | 6/2006 | Paar et al. | 708/492 |

OTHER PUBLICATIONS

A. Halbutogullari et al., Mastrovito Multiplier for General Irreducible Polynomials, IEEE Transactions on Computers, 49:503-518 (May 2000).

C. Koc, RSA Hardware Implementation, RSA Laboratories, Apr. 19, 1996.

H.J. Naussbaumer, Fast Fourier Transform, and Convolution Algorithms, Chapter 8, Springer, Berlin, Germany, 1982.

J.M. Pollard, The Fast Fourier Transform in a Finite Field, Mathematics of Computations 25:158-167 (Apr. 1971).

C. Koc, High-Speed RSA implementation, RSA Laboratories, Nov. 1994.

V. Aho, J.E. Hoperoft, and J.D. Ullman, The Design and Analysis of Computer Algorithms, Ch. 7, Addison-Wesley Publishing Company, 1974.

\* cited by examiner

*Primary Examiner* — Chuong D Ngo
(74) *Attorney, Agent, or Firm* — Klarquist Sparkman, LLP

(57) ABSTRACT

A new hardware architecture is disclosed that performs the modular exponentiation operation, i.e., the computation of $c = m^e \bmod n$ where c, m, e, n are large integers. The modular exponentiation operation is the most common operation in public-key cryptography. The new method, named the Spectral Modular Exponentiation method, uses the Discrete Fourier Transform over a finite ring, and relies on new techniques to perform the modular multiplication and reduction operations. The method yields an efficient and highly parallel architecture for hardware implementations of public-key cryptosystems which use the modular exponentiation operation as the basic step, such as the RSA and Diffie-Hellman algorithms. The method is extended to perform the multiplication operation in extension fields which is necessary to perform exponentiation or various other operations over these extension fields.

3 Claims, 8 Drawing Sheets

SPECTRAL MODULAR ARITHMETIC METHOD AND APPARATUS

CROSS REFERENCE TO RELATED APPLICATIONS

This application claims the benefit of U.S. provisional applications 60/676,108, filed Apr. 28, 2005 and 60/731,142, filed Oct. 28, 2005, which are incorporated herein by reference.

FIELD

The disclosure pertains to cryptographic methods and apparatus.

BACKGROUND

Modular multiplication and modular exponentiation are important operations in many cryptographic systems. Modular multiplication involves finding a product c=ab and then dividing the product c by a modulus M to find a remainder that is referred to a modular product. The result of modular multiplication of a and b performed modulo-M is generally written as c≡ab mod M. The modular multiplication operation is also used to perform modular exponentiation.

Modular multiplication and exponentiation are used in the Diffie-Hellman and RSA public-key cryptosystems, described in, for example, W. Diffie and M. E. Hellman, "New Directions in Cryptography," *IEEE Trans. on Information Theory*, vol. 22, pp. 644-654 (1976), and R. L. Rivest, A. Shamir, and L. Adelman, "A Method for Obtaining Digital Signatures and Public-key Cryptosystems," *Communications of the ACM*, vol. 21, pp. 120-126 (1978). Modular multiplication is also used in elliptic key cryptography over the finite field $GF(2^k)$ and in discrete exponentiation over $GF(2^k)$. These applications are described in Q. K. Koç and T. Acar, "Fast Software Exponentiation in $GF(2^k)$," in T. Lang, J.-M. Muller, and N. Takagi, eds., *Proceedings, 13th Symposium on Computer Arithmetic*, pp. 225-231 (Asilomar, California, Jul. 6-9, 1997). The manipulation of the very large numbers used in these and other cryptographic systems can require complex systems to obtain satisfactory processing speeds. Accordingly, improved methods and apparatus for modular multiplication and exponentiation are needed.

SUMMARY

We describe a new hardware architecture to perform the modular exponentiation operation, i.e., the computation of $c = m^e$ mod n where c, m, e, n are large integers. The modular exponentiation operation is the most common operation in public-key cryptography. The new method, named the Spectral Modular Exponentiation method, uses the Discrete Fourier Transform over a finite ring, and relies on new techniques to perform the modular multiplication and reduction operations. The method yields an efficient and highly parallel architecture for hardware implementations of public-key cryptosystems which use the modular exponentiation operation as the basic step, such as the RSA and Diffie-Hellman algorithms. The method with small modifications can also be extended to perform the multiplication operation in extension fields which is necessary to perform exponentiation operation in group structures defined over these extensions, e.g. elliptic curve groups or Jacobians of hyperelliptic curves. We further describe the elliptic curve point multiplication operation in elliptic curves defined over the prime and extension Galois fields.

The foregoing and other objects, features, and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Disclosed below are representative embodiments of cryptographic methods, systems, and apparatus that can be configured for encryption, decryption, and other operations. While particular examples and applications for the disclosed embodiments are also disclosed, the described systems, methods, and apparatus should not be construed as limiting in any way. Instead, the present disclosure is directed toward all novel and nonobvious features, aspects, and equivalents of the various disclosed embodiments, alone and in various combinations and subcombinations with one another. The disclosed systems, methods, and apparatus are not limited to any specific aspect, feature, or combination thereof, nor do the disclosed systems, methods, and apparatus require that any one or more specific advantages be present or problems be solved. In addition, the attached figures may not show the various ways in which the disclosed systems, methods, and apparatus can be used in conjunction with other systems, methods, and apparatus, and components that are well known in the art are not described in detail.

1 INTRODUCTION

1.1 Approach

The exponentiation operation is the most common operation in public-key cryptography. The Spectral Modular Exponentiation (SME) method is a new method for modular exponentiation of large integers. It takes the integers m, e, n as input, and computes c as the output such that $$c=m^e \pmod{n}.$$

Figure 1:
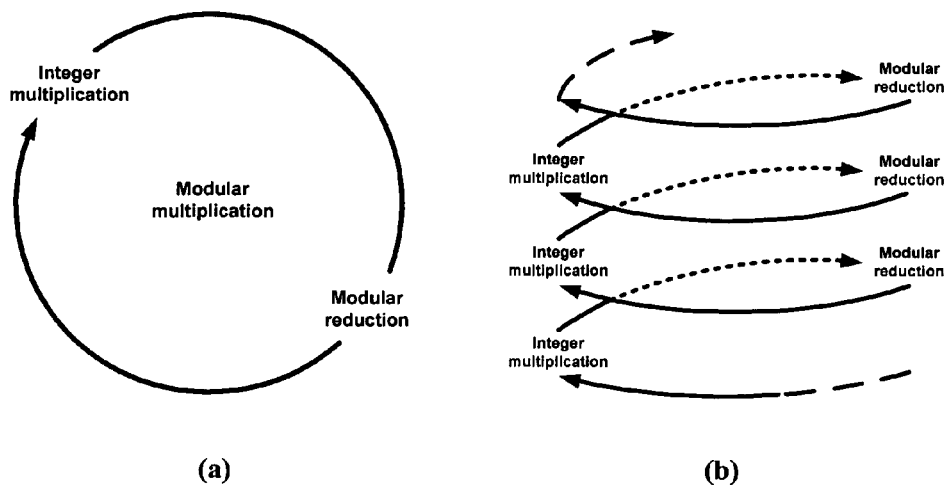
FIGS. 1.*a*-1.*b* illustrate modular operations.

Clearly, a modular exponentiation computation consists of several modular multiplications with respect to the same modulus. A simple model for a modular multiplication, is illustrated in FIG. 1.$a$; the inputs are first multiplied and then reduced with respect to the same modulus. Therefore, it is possible to visualize the exponentiation as a spiral of modular multiplications as seen in FIG. 1.$b$. There exist many methods for computing modular exponentiation, varying according to the choices of integer multiplication and modular reduction; for instance Karatsuba multiplication followed by a Montgomery reduction is one of the most popular approach. Some interleaved methods are also widely accepted but has less important for our discussion.

Recall that spectral techniques give the asymptotically fastest known method (i.e. Schönhage-Strassen multiplication [7]) of integer multiplication. When it comes to the utilization of spectral techniques for modular operations, the current approach is summarized as "perform the integer multiplication in the frequency domain (favorably FFT+convolution) followed by a modular reduction in time domain" (see FIG. 2). If a modular exponentiation computation is considered, because of the forward and backward transformation calculations, spectral methods becomes inefficient for cryptographic sizes. In fact, this method is never used in practice.

Figure 2:
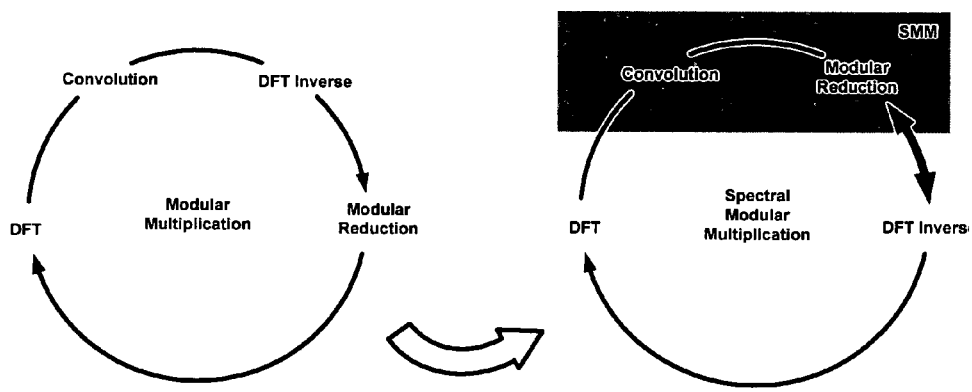
FIG. 2 illustrates Spectral Modular Reduction (SMR).
Figure 3:
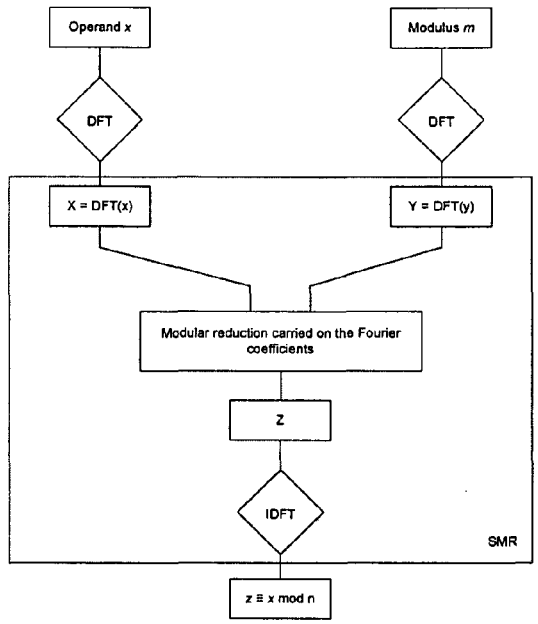
FIG. 3 illustrates the flow diagram of SMR.
Figure 4:
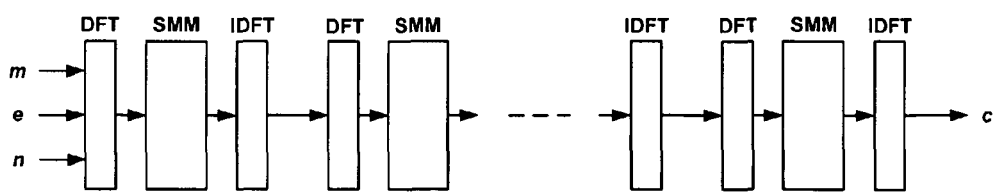
FIG. 4 illustrates the impact of Spectral Modular Exponentiation (SME).
Figure 4:
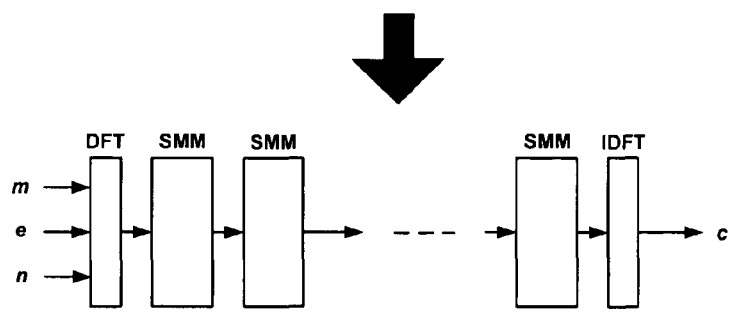

We proposed a method of reduction in the frequency domain which replaces the order of DFT inverse and modular reduction seen in the right-hand side of FIG. 2. We named this reduction as Spectral Modular reduction (SMR), the flow diagram of SMR is seen in FIG. 3. The impact of such an approach can be seen by unfolding the exponentiation spiral with the new setting. This gives a sequence of operations in which DFT and the inverse of DFT are applied consecutively. Consecutive computation of these two transforms is redundant as illustrated in FIG. 4. In other words, the costly forward and backward transformation calculations do not need to be performed for every multiplication carried during the exponentiation. Consequently, this new approach decreases the asymptotic crossovers of the spectral methods to cryptographic sizes while computing the modular exponentiation.

Figure 5:
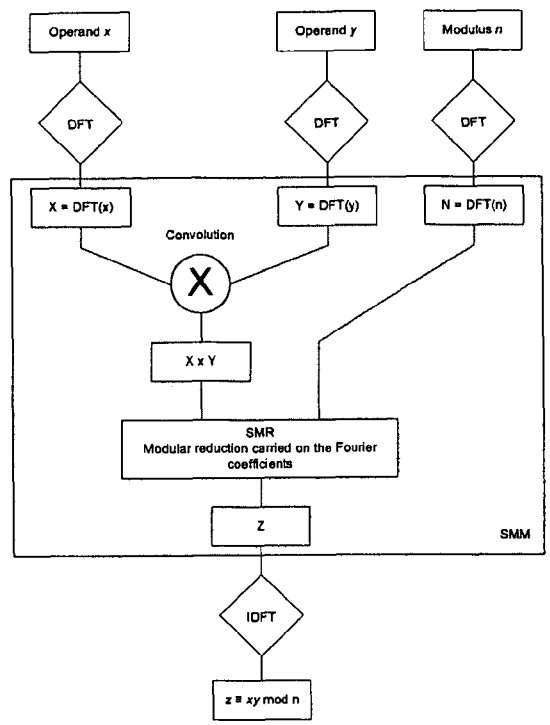
FIG. 5 illustrates the flow diagram of Spectral Modular Multiplication (SMM).
Figure 6:
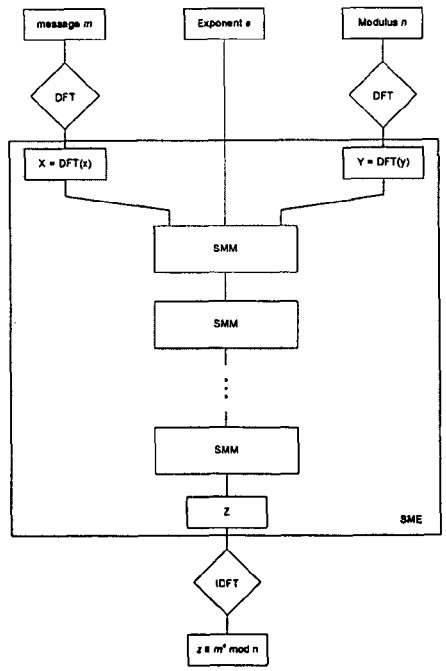
FIG. 6 illustrates the flow of Spectral Modular Exponentiation (SME).

We named this method of modular exponentiation as the Spectral Modular Exponentiation (SME). As we work in the frequency domain at all times, we further named the modular multiplication carried in the frequency as Spectral Modular Multiplication (SMM) which is also the core operation for SME. In FIGS. 5 and 6 we give the flow diagram of SMM and SME respectively.

1.2 Outline

In Section 2 we describe the SME and SMM as a method of modular exponentiation and modular multiplication of large integers. Since both SME and SMM describes operations over integer rings these algorithms are readily usable for cryptosystems such as RSA, DSS and ElGamal. Later, in Section 4, we give a detailed description of how the SMM core can be used for elliptic curve point multiplication operation over prime fields. Therefore, our methods are applicable to ECC over prime fields with large characteristics.

In Section 3, we introduce how these ideas on can be extended to the multiplicative groups of finite field extensions. Because of security concerns, exponentiation operation in extension fields is not popular in use, hence, in this section only the SMM core for extension fields is presented. Again, in Section 4, this SMM core will be the basis of the elliptic curve point multiplication operation over extension fields.

Since the material presented in 2 covers the use of spectral methods for prime finite fields. In Section 3 we particularly concentrate on two types of fields namely;

extension fields: $GF(q)$ with $q=p^k$, p a small odd special prime, binary extension fields: $GF(2^k)$ thus with $q=2^k$ for some $k \geq 1$.

In Section 5, we turn our attention to the architectural discussions. The spectral algorithms yield efficient and highly parallel architectures for hardware implementations of public-key cryptosystems. We describe detailed architectures for SMM cores tailored for prime and extension fields in Sections 2 and 3.

2 SPECTRAL ARITHMETIC OVER RING OF INTEGERS

2.1 Basic Notation

While computing $c=m^e$ mod n, the exponent e can be of any length, and we assume that it is a j-bit integer such that $j \geq 128$. On the other hand, the integers c, m, n are k-bit integers with $k \geq 512$. It is assumed that k=su for some integers s and u, where u is the wordsize of the implementation, i.e., the number of bits in a single word. A k-bit number is viewed as a vector of s words such that each word is u bits. Let $a_i$ be the ith word of the integer a, then the vector representation means that we express the integer in the radix $b=2^u$ as $$a=(a_{s-1}\, a_{s-2} \ldots a_1 a_0)_b$$

where $0 \leq a_i \leq b-1$. This representation implies that $$a = \sum_{i=0}^{s-1} a_i b^i = \sum_{i=0}^{s-1} a_i 2^{ui} = a_0 + a_1 2^u + a_2 2^{2u} + \ldots + a_{s-1} 2^{(s-1)u}.$$

We will also treat integers as polynomials with an indeterminate t. The value of the integer is obtained from its polynomial by evaluating it at t=b. The above integer can be written in the polynomial notation as $$a(t) = \sum_{i=0}^{s-1} a_i t^i = a_0 + a_1 t + a_2 t^2 + \ldots + a_{s-1} t^{(s-1)}.$$

We perform our arithmetic in the finite integer ring $Z_q$. If q is a prime, then the underlying structure will be a finite field. The arithmetic of this ring or field is simply modulo q arithmetic. Another important assumption we make in the SME method is that a d-point DFT exists over the ring $Z_q$. This assumption requires that The multiplicative inverse of d exists in $Z_q$, which requires gcd (d,q)=1.

A principal dth root of unity exists in $Z_q$, which requires that d divides p−1 for every prime p divisor of q. We will denote the principal dth root of unity with w.

We will use the notation $$A(t) = DFT_d^w[a(t)]$$

to denote the d-point DFT using the dth root of w, transforming the time-domain polynomial a(t) to the spectral-domain polynomial A(t). The d-point DFT is performed in the finite ring $Z_q$. Since q, d, and w are fixed, we will also use the simpler notation $A(t)=DFT[a(t)]$ to denote the DFT operation. If a has s words in it, then, its polynomial will also have s words. In general, the value of d is fixed by the ring, and the value of s is equal to $s=\lceil d/2 \rceil$. The empty places in the polynomial a(t), which are the coefficients of the higher orders of t, are filled with zeros in a(t) before applying the d-point DFT. Inevitably, we also need the inverse DFT function, which we denote using the notation $$a(t) = IDFT_d^w[A(t)]$$

or simply as $a(t)=IDFT[A(t)]$. We also make use of the following vector in our operations $$\Gamma = [1, w^{-1}, w^{-2}, \ldots, w^{-(d-1)}].$$

The polynomial representation of $\Gamma$ is given as $$\Gamma(t) = 1 + w^{-1}t + w^{-2}t^2 + \ldots + w^{-(d-1)}t^{d-1}.$$

The modulus n is a special number, for example, it is the product of two primes in RSA, and a prime number in Diffie-Hellman. Our assumption is that n is always odd. Let $n_0$ denote the least significant word of n, i.e., $n_0 = n \pmod b$, which is also an odd integer. Let $v_0$ be the multiplicative inverse of $n_0$ modulo b, i.e., $$v_0 = n_0^{-1} \pmod b.$$

We need to use an integer multiple of n in our method, which we denote by $\theta$, and is derived from n such that $$\theta = v_0 n.$$

Note that since $v_0 n_0 = 1 \pmod b$, the least significant word of $\theta$ is equal to 1, i.e., $\theta_0 = 1$. The inverse $v_0 = n_0^{-1} \pmod b$ can be computed using the extended Euclidean algorithm, and we will give an explicit algorithm to compute it in this paper.

Let $\lambda = b^d \pmod n$. We name this integer as the Montgomery coefficient, since it is used inside the Montgomery multiplication algorithm. The number $b^d$ is a 2s-word number, however, $\lambda$ is an s-word number since $\lambda = b^d \pmod n$. We will also use the polynomial representation of $\lambda$, which is denoted by $\lambda(t)$. Furthermore, we also define $\delta$ as the square of $\lambda$ modulo n. The number $\delta$ is also an s-word number since $\delta = \lambda^2 \pmod n$. We will also the polynomial representation of $\delta$, which is denoted by $\delta(t)$.

In addition to the usual scalar multiplication, we will also utilize the componentwise multiplication of vectors in the ring $Z_q$, and denote this operation with the symbol $\odot$ as $$c(t) = a(t) \odot b(t).$$

Given the vectors $a(t)=(a_0, a_1, \ldots, a_{d-1})$ and $b(t)=(b_0, b_1, \ldots, b_{d-1})$, the resulting vector after the $\odot$ operation will be $c(t)=(c_0, c_1, \ldots, c_{d-1})$ such that $c_i = a_i b_i \pmod q$ for $i=0, 1, \ldots, d-1$.

TABLE 1

The symbols used in the SME method.

| Symbol | Meaning | Relationship |
| --- | --- | --- |
| c, m, e, n | Output and input integers | $c = m^e \pmod n$ |
| k | Number of bits in c, m, n | usually $k \geq 512$ |
| u | Length of a single word | k is a multiple of u |
| s | Number of words in c, m, n | $k = su$ |

TABLE 1-continued

The symbols used in the SME method.

| Symbol | Meaning | Relationship |
| --- | --- | --- |
| b | Radix of representation | $b = 2^u$ |
| a(t) | Polynomial representation of a | $a(b) = a$ |
| d | Length of the DFT | $s = \lceil d/2 \rceil$ |
| $Z_q$ | Ring of integers modulo q | $\gcd(d, q) = 1$ |
| p | A prime which divides q | d divides $p-1$ for every p |
| w | Principal dth root of unity in $Z_q$ | $w^d = 1 \pmod q$ |
| $DFT_d^w[a(t)]$ | d-point DFT of a(t) in $Z_q$ | $A(t) = DFT[a(t)]$ |
| $IDFT_d^w[A(t)]$ | Inverse DFT function | $a(t) = IDFT[A(t)]$ |
| $\Gamma$ | $\Gamma = [1, w^{-1}, w^{-2}, \ldots, w^{-(d-1)}]$ | w is dth root of unity |
| n | Modulus | n is odd |
| $n_0$ | Least significant word of n | $n_0 = n \pmod b$ |
| $v_0$ | Inverse of $n_0$ modulo b | $v_0 = n_0^{-1} \pmod b$ |
| $\theta$ | $v_0$ multiple of n | $\theta = v_0 n$ and $\theta_0 = 1$ |
| $\lambda$ | Montgomery coefficient | $\lambda = b^d \pmod n$ |
| $\delta$ | Square of $\lambda$ modulo n | $\delta = \lambda^2 \pmod n$ |
| $\odot$ | Componentwise multiplication in $Z_q$ | $c(t) = a(t) \odot b(t)$ |

2.2 Spectral Modular Exponentiation Method

The Spectral Modular Exponentiation (SME) method relies on the Spectral Modular Multiplication (SMM) method, which is described in detailed in the following section. It also relies on the d-point Discrete Fourier Transform function in $Z_q$ and the function $DFT_d^w[\cdot]$ needs to be available. However, the DFT function is used only 5 times in the SME method, and thus, the efficiency of the DFT implementation is not very crucial for the efficiency of the SME method.

Furthermore, any addition chain (exponentiation) method can be used in the SME method. We illustrate it using the binary method, however, more advanced algorithms such as the m-ary method, sliding windows method, etc., can also be utilized.

Input: The inputs are m, e, and n such that m and n are s words and the exponent e is j bits.

Preprocessing: It is often the case that the modulus n is available before the message m, for example, this is true for the digital signature algorithms. Therefore, we break the preprocessing into two stages as follows.

Preprocessing with n: Given n, obtain $n_0$.

1. Compute $v_0 = n_0^{-1} \pmod{2^u}$ using the extended Euclidean algorithm as follows:

$v_0 = 1$ for $i=2$ to u if $n_0 v_0 \geq 2^{i-1} \mod 2^i$ then $v_0 = v_0 + 2^{i-1}$ return $v_0$ 2. Compute $\theta = v_0 n$ and obtain the polynomial $\theta(t)$. Note that the least significant word of $\theta$ is 1, i.e., $\theta_0 = 1$.

3. Compute $\Theta(t)=DFT[\theta(t)]$ using the DFT function. An efficient implementation of the DFT function, i.e., the FFT (Fast Fourier Transform) algorithm, may be desired. However, simpler DFT implementations, for example, the matrix-vector product implementation can also be utilized. The DFT and the inverse DFT functions require d and w. Additionally, $d^{-1} \mod q$ is precomputed and saved.

4. Compute the s-word integers $\lambda = b^d \pmod n$ and $\delta = \lambda^2 \pmod n$ using integer division. Also obtain the d-word polynomial representation $\delta(t)$ of $\delta$. Again the higher order words are filled with zeros to make the polynomial d words. We then use the DFT function to compute $\Delta(t) = DFT[\delta(t)]$.

5. Assign $x=1$ and obtain the polynomial representation of $x(t)$ which is equal to $x(t)=1$. Compute the polynomial $X(t)=DFT[x(t)]$. This step is simplified using the fact that $x(t)=1$, and thus, we do not need to use the DFT function to compute $X(t)$. It is obtained using assignment as $X(t)=1+1 \cdot t+ \ldots +1 \cdot t^{d-1}$.

Preprocessing with m: Given m, obtain its polynomial representation $m(t)$.
  1. Compute the polynomial $M(t)=DFT[m(t)]$.
  2. Assign $C(t)=X(t)$. Recall that $x(t)=1$ and $X(t)=DFT[x(t)]=[1, 1, \ldots, 1]$.
  3. Use the Spectral Modular Multiplication (SMM) method to multiply $M(t)$ and $\Delta(t)$ in order to obtain $\overline{M}(t)$. We will denote this step by $$\overline{M}(t)=SMM[M(t),\Delta(t)].$$

The definition and detailed steps of the SMM method are given in the next section.
  4. Use the SMM method to multiply $C(t)$ and $\Delta(t)$ in order to obtain $\overline{C}(t)$. We will denote this step by $$\overline{C}(t)=SMM[C(t)\Delta(t)].$$

Exponentiation Loop: The exponentiation operation is performed as soon as the j-bit exponent e is available. Let the binary expansion of e be $(e_{j-1} e_{j-2} \ldots e_1 e_0)_2$. The exponentiation operation needs $\overline{C}(t)$ and $\overline{M}(t)$ as input in addition to the exponent e.

for i=j−1 downto 0

$$\overline{C}(t)=SMM[\overline{C}(t),\overline{C}(t)]$$

if $e_i=1$ then $\overline{C}(t)=SMM[\overline{C}(t),\overline{M}(t)]$

Postprocessing: After the exponentiation loop is completed, we will have a final value of $\overline{C}(t)$.

This vector will now be brought back to the time domain as follows.
  1. Obtain $C(t)$ using the SMM method by multiplying $\overline{C}(t)$ and $X(t)$ as follows $$C(t)=SMM[\overline{C}(t),X(t)].$$

2. Obtain $c(t)$ using the Inverse DFT function as follows $$c(t)=IDFT[C(t)].$$

Output: The integer c representing the polynomial $c(t)$ is the output such that $c=m^e \pmod{n}$.

2.3 Spectral Modular Multiplication Method

The SMM method takes two arguments, such as $A(t)$ and $B(t)$, and computes $S(t)$ as the output. We will denote the operation using $$R(t)=SMM[A(t),B(t)].$$

The steps of the SMM method are given below.
1: $R(t)=A(t) \odot B(t) \pmod{q}$
2: $\alpha=0$
3: for i=0 to d−1
4: $r_0=d^{-1}(R_0+R_1+ \ldots +R_{d-1}) \pmod{q}$
5: $\beta=-(r_0+\alpha) \pmod{b}$
6: $\alpha=(r_0+\alpha+\beta)/b$
7: $R(t)=R(t)+\beta \cdot \Theta(t) \pmod{q}$
8: $R(t)=R(t)-(r_0+\beta) \pmod{q}$
9: $R(t)=R(t) \odot \Gamma(t) \pmod{q}$
10: end for
11: return $R(t)$ The steps of the SMM method are explained in detail below. In addition to the inputs, the SMM function has access to parameters available after the preprocessing steps of the SME method. These parameters are $d^{-1}$, $\Theta M$, and $\Gamma(t)$. The SME method performs only modulo q and modulo b operations.

1. This is the vector $\odot$ operation in the ring $Z_q$. Given the vectors $A(t)$ and $B(t)$, we compute $R(t)$ such that $R_i=A_i B_i \pmod{q}$ for i=0, 1, ..., d−1.
2. Initial value of $\alpha$ is assigned as zero.
3. The for loop is executed d times for i=0, 1, ..., d−1.
4. After step 1, we have the vector $R(t)$. The elements are summed modulo q to obtain $$R_0+R_1+ \ldots +R_{d-1} \pmod{q},$$

and multiplied by $d^{-1} \pmod q$ in order to obtain $r_0$. The inverse $d^{-1}$ was already computed in the preprocessing stage of the SME method.
5. Since $b=2^u$, the computation of $\beta=-(r_0+\alpha) \bmod b$ is a 1-word operation, involving an addition and sign-change (2's complement) operations on 1-word numbers.
6. The value of $\alpha$ is updated for the next loop instance as $\alpha=(r_0+\alpha+\beta)/b$.
7. The 1-word number $\beta$ is multiplied with every element of $\Theta(t)$ and the result is added to the corresponding element of $R(t)$. Given $N(t)=(N_0, N_1, \ldots, N_{d-1})$, we compute the elements of the new $R(t)$ as $$R_i=R_i+\beta \cdot \Theta_i \pmod{q}$$

for i=0, 1, ..., d−1.
8. This is a vector operation. The 1-word number $r_0+\beta$ is subtracted from every element of $R(t)$, and therefore, we have $$R_i=R_i-(r_0+\beta) \pmod{q}$$

for i=0, 1, ..., d−1.
9. This is also a vector operation. The resulting $R(t)$ from the previous step is multiplied componentwise with the vector $\Gamma(t)$. Therefore, the elements of the new $R(t)$ are found as $$R_i=R_i \cdot \Gamma_i \pmod{q}$$

for i=0, 1, ..., d−1.
10. The end of for loop.
11. The multiplication result $R(t)=SMM[A(t),B(t)]$ is returned.

2.4 An Example Exponentiation Using the SME Method

In this section, we give an example exponentiation computation using the SME method with the input values as m=27182, e=53, and n=31417. We will describe the steps of the SME method performing this modular exponentiation operation, giving the temporary results and the final result $c=m^e \pmod{n}$.

We select the length of a single word as u=4. Therefore, the radix of the representation is $b=2^u=16$, i.e., the numbers are represented in hexadecimal. Since $$n=(31417)_{10}=(0111\ 1010\ 1011\ 1001)_2=(7AB9)_{16},$$

we have k=16 and s=4. The polynomial representation of n is given as $$n(t)=9+11t+10t^2+7t^3,$$

in which the digits are expressed in decimal. The integer value $n=(31417)_{10}=(7AB9)_{16}$ is obtained by evaluating $n(t)$ at t=16 in any selected basis.

We will perform our computations in the Fermat ring $Z_q$ where $q=2^{20}+1$. Since s=4, we need a DFT function in this ring with the length d=8. It turns out that such DFT exists in this ring with the principal 8th root of unity given as w=32. Furthermore, the vector $\Gamma(t)$ is given as $$\Gamma(t) = 1 + w^{-1}t + w^{-2}t^2 + w^{-3}t^3 + w^{-4}t^4 + w^{-5}t^5 + w^{-6}t^6 + w^{-7}t^7$$
$$= 1 + 1015809t + 1047553t^2 + 1048545t^3 + 1048576t^4 + 32768t^5 + 1024t^6 + 32t^7.$$

The steps of the SME method computing this modular exponentiation are described below.

Preprocessing with n: Given $n=(7AB9)_{16}$, we have $n_0=9$.
1. The inversion algorithm computes $v_0 = 9^{-1} \pmod{16}$ as $v_0 = 9$.
2. The computation of $\theta = v_0 n$ gives $9 \cdot 31417 = 282753$, which is expressed in binary and in hexadecimal as $$\theta = (0100\ 0101\ 0000\ 1000\ 0001)_2 = (45081)_{16}.$$

Recall that $\theta$ is $s+1=5$ words and $\theta_0=1$. We also obtain the polynomial $\theta(t)$ as $$\theta(t) = 1 + 8t + 5t^3 + 4t^4.$$

3. The computation of $\Theta(t) = \text{DFT}[\theta(t)]$ is accomplished using the DFT function. In Section 4, we describe the DFT computation and particularly evaluate this transform. We obtain the result of the DFT as $$\Theta(t) = 18 + 164093t + 3077t^2 + 262301t^3 + 1048569t^4 + 884478t^5 + 1045510t^6 + 786270t^7.$$

Recall that we work in the finite ring $Z_q$ for $q = 2^{22} + 1 = 1048577$, and thus, the coefficients of the polynomial $\Theta(t)$ are in the range $[0, 2^{20}+1)$.

In this step, we also compute and save $d^{-1} \pmod{q}$ as $$d^{-1} = 8^{-1} \pmod{2^{20}+1} = 917505.$$

4. We compute the Montgomery coefficient and its square as $$\lambda = 16^8 \pmod{31417} = 12060,$$

$$\delta = 12060^2 \pmod{31417} = 14307.$$

The polynomial representation of $\delta$ is found using $\delta = (14307)_{10} = (37E3)_{16}$ as $$\delta(t) = 3 + 14t + 7t^2 + 3t^3.$$

Furthermore, we obtain the spectral representation of $\delta(t)$ using the DFT as $$\Delta(t) = 27 + 105923t + 11260t^2 + 451683t^3 1048570t^4 + 956996t^5 + 1037309t^6 + 582564t^7.$$

5. Given $x(t) = 1$, the spectral representation of $x(t)$ is found as $$X(t) = 1 + t + t^2 + t^3 + t^4 + t^5 + t^6 + t^7.$$

Preprocessing with m: Given $m = (27182)_{10} = (6A2E)_{16}$, we have $m(t) = 14 + 2t + 10t^2 + 6t^3$.
1. Given $m(t)$, we obtain its spectral representation $M(t)$ using the DFT as $$M(t) = 32 + 206926t + 1044485t^2 + 55502t^3 + 16t^4 862159t^5 + 4100t^6 + 972623t^7.$$

2. The initial value of $C(t)$ is given as $$C(t) = X(t) = 1 + t + t^2 + t^3 + t^4 + t^5 + t^6 + t^7.$$

3. The SMM method is used to compute $\overline{M}(t) = \text{SMM}[M(t), \Delta(t)]$ with inputs $$M(t) = 32 + 206926t + 1044485t^2 + 55502t^3 + 16t^4 + 862159t^5 + 4100t^6 + 972623t^7,$$

$$\Delta(t) = 27 + 105923t + 11260t^2 + 451683t^3 + 1048570t^4 + 956996t^5 + 1037309t^6 + 582564t^7.$$

We then use the SMM method to find the resulting polynomial $\overline{M}(t)$ given the inputs $M(t)$ and $\Delta(t)$. First we execute Step 1 in the SMM method, and obtain the initial value of $R(t)$ using the rule $R_i = M_i \cdot \Delta_i \pmod{q}$ for $i = 0, 1, \ldots, 7$ as $$R(t) = 864 + 866244t + 61468t^2 + 979527t^3 + 1048465t^4 + 464721t^5 + 987165t^6 + 834767t^7.$$

In Step 2 of the SMM method, We assign the initial value of $\alpha = 0$, and start the for loop for $i = 0, 1, \ldots, 7$. We illustrate the computation of the instance of the loop for $i = 0$ in Table 2. The for loop needs to execute for the remaining values of $i$ as $i = 1, 2, \ldots, 7$ in order to compute the resulting product $\overline{M}(t)$ which is found as $$\overline{M}(t) = 354 + 463771t + 11385t^2 + 686651t^3 + 156t^4 + 722398t^5 + 1037434t^6 + 225086t^7.$$

TABLE 2

The SME method for loop instance $i = 0$.

| Step | Operation and Result |
|---|---|
| 4: | $r_0 = d^{-1} \cdot (R_0 + R_1 + R_2 + R_3 + R_4 + R_5 + R_6 + R_7) \pmod{q}$ |
|    | $r_0 = 917505 \cdot (864 + 866244 + 61468 + 979527 + 104846 + 464721 + 987165 + 834767) \pmod{1048567} = 42$ |
| 5: | $\beta = -(r0 + \alpha) \pmod{b} = -(42 + 0) \pmod{16} = 6$ |
| 6: | $\alpha = (r_0 + 0 + \beta)/b = (42 + 6)/16 = 3$ |
| 7: | $R_i = R_i + \beta \cdot \Theta_i \pmod{q}$ |
|    | $R(t) = 972 + 802225t + 79930t^2 + 456179t^3 + 1048417t^4 + 528704t^5 + 968763t^6 + 309502t^7$ |
| 8: | $R_i = R_i - (r_0 + \beta) = R_i - 48 \pmod{q}$ |
|    | $R(t) = 924 + 802177t + 79882t^2 + 456131t^3 + 1048369t^4 + 528656t^5 + 968715t^6 + 309454t^7$ |
| 9: | $R_i = R_i \Gamma_i \pmod{q}$ |
|    | $R(t) = 924 + 802177t + 79882t^2 + 456131t^3 + 1048369t^4 + 528656t^5 + 968715t^6 + 599495t^7$ |

4. In this step, the SMM method is used to compute $\overline{C}(t) = \text{SMM}[C(t), \Delta(t)]$ with inputs $$C(t) = 1 + t + t^2 + t^3 + t^4 + t^5 + t^6 + t^7,$$

$$\Delta(t) = 27 + 105923t + 11260t^2 + 451683t^3 + 1048570t^4 + 956996t^5 + 1037309t^6 + 582564t^7.$$

We will not give the details of this multiplication since it is similar to the previous one. The result is obtained as $$\overline{C}(t) = 342 + 472129t + 17495t^2 + 875041t^3 + 132t^4 + 730372t^5 + 1031256t^6 + 20260t^7.$$

Exponentiation Loop: The loop starts with the values of $\overline{M}(t)$ and $\overline{C}(t)$ computed above as $$\overline{M}(t) = 354 + 463771t + 11385t^2 + 686651t^3 + 156t^4 + 722398t^5 + 1037434t^6 + 225086t^7.$$

$$\overline{C}(t) = 342 + 472129t + 17495t^2 + 875041t^3 + 132t^4 + 730372t^5 + 1031256t^6 + 20260t^7.$$

Given the exponent value $e = (53)_{10} = (110101)_2$, the exponentiation algorithm performs squarings and multiplications using the SMM method. Since $j = 6$, the value of $i$ starts from $i = 5$ and moves down to zero, and computes the new value of $\overline{C}(t)$ using the binary method of exponentiation as described. The steps of the exponentiation and intermediate values of $\overline{C}(t)$ are tabulated in Table 3. The final value is computed as $\overline{C}(t)=123+34099t+40979t^2+229426t^3+43t^4+31539t^5+1007636t^6+753717t^7.$

TABLE 3

The steps of the exponentiation loop.

| i | $e_i$ | Operation | $\overline{C}(t)$ |
|---|---|---|---|
|   |   | Start | $342 + 472129t + 17495t^2 + 875041t^3 + 132t^4 + 730372t^5 + 1031256t^6 + 20260t^7$ |
| 5 |   | $\overline{C}(t) = SMM[\overline{C}(t), \overline{C}(t)]$ | $270 + 44476t + 108628t^2 + 286841t^3 + 58t^4 + 37692t^5 + 940117t^6 + 680064t^7$ |
|   | 1 | $\overline{C}(t) = SMM[\overline{C}(t), \overline{M}(t)]$ | $288 + 741281t + 71696t^2 + 769759t^3 + 68t^4 + 473378t^5 + 976913t^6 + 113124t^7$ |
| 4 |   | $\overline{C}(t) = SMM[\overline{C}(t), \overline{C}(t)]$ | $348 + 869774t + 81984t^2 + 183179t^3 + 92t^4 + 338831t^5 + 966721t^6 + 705938t^7$ |
|   | 1 | $\overline{C}(t) = SMM[\overline{C}(t), \overline{M}(t)]$ | $297 + 42796t + 20613t^2 + 615596t^3 + 129t^4 + 39470t^5 + 1028230t^6 + 351407t^7$ |
| 3 |   | $\overline{C}(t) = SMM[\overline{C}(t), \overline{C}(t)]$ | $123 + 34099t + 40979t^2 + 229426t^3 + 43t^4 + 31539t^5 + 1007636t^6 + 753717t^7$ |
|   | 0 |   | $123 + 34099t + 40979t^2 + 229426t^3 + 43t^4 + 31539t^5 + 1007636t^6 + 753717t^7$ |
| 2 |   | $\overline{C}(t) = SMM[\overline{C}(t), \overline{C}(t)]$ | $336 + 857269t + 74835t^2 + 1014675t^3 + 94t^4 + 326774t^5 + 973908t^6 + 947609t^7$ |
|   | 1 | $\overline{C}(t) = SMM[\overline{C}(t), \overline{M}(t)]$ | $183 + 162592t + 51267t^2 + 691423t^3 + 67t^4 + 945569t^5 + 997444t^6 + 297954t^7$ |
| 1 |   | $\overline{C}(t) = SMM[\overline{C}(t), \overline{C}(t)]$ | $348 + 869774t + 81984t^2 + 183179t^3 + 92t^4 + 338831t^5 + 966721t^6 + 705938t^7$ |
|   | 0 |   | $348 + 869774t + 81984t^2 + 183179t^3 + 92t^4 + 338831t^5 + 966721t^6 + 705938t^7$ |
| 0 |   | $\overline{C}(t) = SMM[\overline{C}(t), \overline{C}(t)]$ | $297 + 42796t + 20613t^2 + 615596t^3 + 129t^4 + 39470t^5 + 1028230t^6 + 351407t^7$ |
|   | 1 | $\overline{C}(t) = SMM[\overline{C}(t), \overline{M}(t)]$ | $123 + 34099t + 40979t^2 + 229426t^3 + 43t^4 + 31539t^5 + 1007636t^6 + 753717t^7$ |

Postprocessing: After the exponentiation loop is completed, we have the final value $\overline{C}(t)$. In this step, we have two consecutive SMM executions.

We obtain C(t) using $C(t)=SMM[\overline{C}(t),X(t)]$ using the inputs $\overline{C}(t)=123+34099t+40979t^2+229426t^3+43t^4+31539t^5+1007636t^6+753717t^7.$ $X(t)=1+t+t^2+t^3+t^4+t^5+t^6+t^7.$ This computation finds C(t) as $C(t)=312+76043t+36932t^2+58506t^3+112t^4+71693t^5+1011781t^6+842895t^7,$ We obtain c(t) using the inverse DFT function c(t)= IDFT[C(t)], which gives $c(t)=9+4t+3t^2+6t^3.$ Thus, we obtain the final value as $c=(6349)_{16}= (25417)_{10}$, which is equal to $25417=227182^{53}(mod\ 31417)$ as required.

2.5 Computation of Discrete Fourier Transform in $Z_q$

The DFT of a sequence $a=[a_0, a_1, \ldots, a_{d-1}]$ is defined as the sequence $A=[A_0, A_i, \ldots, A_{d-1}]$ such that $$A_j = \sum_{i=0}^{d-1} a_i w_d^{ij} \ (mod\ q),$$

where w is the dth root of unity. The DFT function is normally used over the field of complex numbers C, however, in our application, we need a finite ring or field since we cannot perform infinite precision arithmetic.

The above sum can also be written as a matrix-vector product as $$\begin{bmatrix} A_0 \\ A_1 \\ A_2 \\ \vdots \\ A_{d-1} \end{bmatrix} = \begin{bmatrix} 1 & 1 & 1 & \cdots & 1 \\ 1 & w & w^2 & \cdots & w^{d-1} \\ 1 & w^2 & w^4 & \cdots & w^{2(d-1)} \\ \vdots & \vdots & \vdots & & \vdots \\ 1 & w^{d-1} & w^{2(d-1)} & \cdots & w^{(d-1)(d-1)} \end{bmatrix} \begin{bmatrix} a_0 \\ a_1 \\ a_2 \\ \vdots \\ a_{d-1} \end{bmatrix} \ (mod\ q).$$

We denote this matrix-vector product by A=Ta, where T is the d×d transformation matrix. The inverse DFT is defined as $a=T^{-1}A$. It turns out that the inverse of T is obtained by replacing w with $w^{-1}$ in the matrix, and by placing the multiplicative factor $d^{-1}$ in front of the matrix. The inverse matrix is given as $$T^{-1} = d^{-1} \cdot \begin{bmatrix} 1 & 1 & 1 & \cdots & 1 \\ 1 & w^{-1} & w^{-2} & \cdots & w^{-(d-1)} \\ 1 & w^{-2} & w^{-4} & \cdots & w^{-2(d-1)} \\ \vdots & \vdots & \vdots & \vdots & \vdots \\ 1 & w^{-(d-1)} & w^{-2(d-1)} & \cdots & w^{-(d-1)(d-1)} \end{bmatrix} \ (mod\ q).$$

The matrix-vector product definition of the DFT implies an algorithm to compute the DFT function, however, it requires d multiplications and d−1 additions to compute an entry of the output sequence A. Thus, the total number of multiplications is $d^2$, and the total number of additions is d(d−1). This complexity is acceptable for the SME method since we need to use the DFT or IDFT functions only 4 times. If desired, the Fast Fourier Transform (FFT) algorithm can be used which reduces the complexity from $O(d^2)$ to $O(d\ log\ d)$.

We now derive the transformation and inverse transformation matrices for the example DFT in Section 4, and perform a DFT computation for illustrating the properties of the arithmetic of the DFT in $Z_q$. In our example, we have $q=2^{20}+1$, d=8, and w=32. The elements of the transformation matrix T are of the form $w^{i \cdot j}$ (mod q) for i, j=0, 1, . . . , 7. We compute these values and place it in the transformation matrix as follows:

$$T = \begin{bmatrix} 1 & 1 & 1 & 1 & 1 & 1 & 1 & 1 \\ 1 & 32 & 1024 & 32768 & 1048576 & 1048545 & 1047553 & 1015809 \\ 1 & 1024 & 1048576 & 1047553 & 1 & 1024 & 1048576 & 1047553 \\ 1 & 32768 & 1047553 & 32 & 1048576 & 1015809 & 1024 & 1048545 \\ 1 & 1048576 & 1 & 1048576 & 1 & 1048576 & 1 & 1048576 \\ 1 & 1048545 & 1024 & 1015809 & 1048576 & 32 & 1047553 & 32768 \\ 1 & 1047553 & 1048576 & 1024 & 1 & 1047553 & 1048576 & 1024 \\ 1 & 1015809 & 1047553 & 1048545 & 1048576 & 32768 & 1024 & 32 \end{bmatrix}.$$

The inverse transformation matrix $T^{-1}$ can be obtained similarly using the multiplicative inverses $$d^{-1} = 8^{-1} \pmod{2^{20}+1} = 917505.$$

$$w^{-1} = 32^{-1} \pmod{2^{20}+1} = 1015809.$$

We obtained it as $$T^{-1} = \begin{bmatrix} 1 & 1 & 1 & 1 & 1 & 1 & 1 & 1 \\ 1 & 1015809 & 1047553 & 1048545 & 1048576 & 32768 & 1024 & 32 \\ 1 & 1047553 & 1048576 & 1024 & 1 & 1047553 & 1048576 & 1024 \\ 1 & 1048545 & 1024 & 1015809 & 1048576 & 32 & 1047553 & 32768 \\ 1 & 1048576 & 1 & 1048576 & 1 & 1048576 & 1 & 1048576 \\ 1 & 32768 & 1047553 & 32 & 1048576 & 1015809 & 1024 & 1048545 \\ 1 & 1024 & 1048576 & 1047553 & 1 & 1024 & 1048576 & 1047553 \\ 1 & 32 & 1024 & 32768 & 1048576 & 1048545 & 1047553 & 1015809 \end{bmatrix}.$$

We will now perform the DFT computation $\Theta(t) = DFT[\theta(t)]$ with the input polynomial $$\theta(t) = 1 + 8t + 5t^3 + 4t^4,$$

as mentioned in Section 4. This polynomial is expressed as a vector $$\theta = [1,8,0,5,4,0,0,0]$$

and enters the DFT function, producing the output vector $\Theta$. Using the matrix-vector product algorithm, we obtain the vector $\Theta$ as $$\begin{bmatrix} 1 & 1 & 1 & 1 & 1 & 1 & 1 & 1 \\ 1 & 32 & 1024 & 32768 & 1048576 & 1048545 & 1047553 & 1015809 \\ 1 & 1024 & 1048576 & 1047553 & 1 & 1024 & 1048576 & 1047553 \\ 1 & 32768 & 1047553 & 32 & 1048576 & 1015809 & 1024 & 1048545 \\ 1 & 1048576 & 1 & 1048576 & 1 & 1048576 & 1 & 1048576 \\ 1 & 1048545 & 1024 & 1015809 & 1048576 & 32 & 1047553 & 32768 \\ 1 & 1047553 & 1048576 & 1024 & 1 & 1047553 & 1048576 & 1024 \\ 1 & 1015809 & 1047553 & 1048545 & 1048576 & 32768 & 1024 & 32 \end{bmatrix} \begin{bmatrix} 1 \\ 8 \\ 0 \\ 5 \\ 4 \\ 0 \\ 0 \\ 0 \end{bmatrix} = \begin{bmatrix} 18 \\ 164093 \\ 3077 \\ 262301 \\ 1048569 \\ 884478 \\ 1045510 \\ 786270 \end{bmatrix}.$$

Recall that all multiplications and additions are performed modulo q where $q = 2^{20}+1$. We express $\Theta$ as a polynomial $$\Theta(t) = 18 + 164093t + 3077t^2 + 262301t^3 + 1048569t^4 + 884478t^5 + 1045510t^6 + 786270t^7$$

which was the result obtained in Step 4 of 'Preprocessing with n' in Section 4.

2.6 Parameter Selection

In this section, we describe the methodology for selecting the parameters for the DFT and SME functions in order to apply the method in public-key cryptography. We will tabulate some example parameters for modular exponentiations using the SME method, starting from 530 bits up to 4,110 bits. We also tabulate typical rings and their DFT parameters for use in the SME function.

A ring for which q is of the form $2^v \pm 1$ is the most suitable for the SME computation since the modular arithmetic operations for such q are simplified. The rings of the form $2^v - 1$ are called the Mersenne rings, while the rings of the form $2^v + 1$ are called the Fermat rings. In Table 16 and Table 17 in the Appendix Section of this document, we tabulate the Fermat and Mersenne rings suitable for the SME function. Furthermore, we also tabulate a root of unity and the DFT length for each ring. Whenever possible, we select the root of unity as $w = 2$ or $w = -2$ since multiplication with such numbers are accomplished by shifting.

The Mersenne and Fermat rings are not the only suitable rings for the SME method. Let q" (not necessarily a prime) be a small divisor of q'. The rings of the form $Z_{q'/q''}$ are also quite useful. Since q" divides q', the arithmetic modulo (q'/q") can be carried in the ring $Z_{q'}$. By selecting $Z_{q'}$ as a Mersenne or Fermat ring, we also simplify the arithmetic. Such rings are called pseudo Mersenne or pseudo Fermat rings. We also propose the use of such rings in the SME method. In Table 18A, 18B, 18C and Tables 19A, 19B, we tabulate the pseudo Mersenne and Fermat rings together with their root of unity and the length of the DFT values.

Once the underlying ring and the DFT length and the root of unity are selected, the maximum modulus size in the SME method can be computed by finding the radix b. The relation between these parameters is given by the following inequality $$b^4 < \frac{3q}{s^3}. \tag{1}$$

In Table 4, we give some example rings and their parameters. To illustrate the methodology, we select a ring from this table, e.g., q=q'/q''=$(2^{57}-1)/7$. This ring comes with the root of unity w=−2 and the length s=57. Using the q and s values and the above inequality, we compute $$b < \sqrt[4]{\frac{3 \cdot (2^{57}-1)}{7 \cdot (57)^3}} \approx 759.93.$$

Therefore, we find u=$\lfloor \log_2(b) \rfloor$=9. Since s=57, we find the maximum bit length of the exponentiation as k=s·u=57·9=513 as given in Table 4.

TABLE 4

Parameter selection.

| Bits k | Ring q | DFT d | Root w | Wordsize u | Words s |
|---|---|---|---|---|---|
| 513 | $(2^{57}-1)/7$ | 114 | −2 | 10 | 53 |
| 518 | $2^{73}-1$ | 73 | 2 | 14 | 37 |
| 518 | $(2^{73}+1)/3$ | 73 | 4 | 14 | 37 |
| 768 | $2^{64}+1$ | 128 | 2 | 12 | 64 |
| 1,185 | $2^{79}-1$ | 158 | −2 | 15 | 79 |
| 1,792 | $2^{128}+1$ | 128 | 2 | 28 | 64 |
| 2,060 | $(2^{193}+1)/3$ | 206 | 2 | 20 | 103 |
| 2,163 | $2^{103}-1$ | 206 | −2 | 21 | 103 |
| 3,456 | $(2^{128}+1)$ | 256 | −2 | 27 | 128 |
| 4,170 | $2^{139}-1$ | 274 | −2 | 30 | 139 |

2.7 Improved Parameter Selection

The SMM method can be improved with a simple arrangement. It is possible to replace the multiplication β·Θ(t) in Step 7 of the SMM method with additions at a cost of precomputations and storage space. This approach increases the wordsize and allows the selection of a smaller ring for a similar modulus size.

Let $\theta^i(t)$ be the polynomial representation of an integer multiple of n such that $\theta_0^i = 2^{i-1}$ for i=1, 2, . . . , u. We can now write β·Θ(t) as $$\beta \cdot \Theta(t) = \sum_{i=1}^{u} \beta_i \cdot \Theta^i(t), \tag{2}$$

where $\beta_i$ is a binary digit of β and $\Theta^i(t)$=DFT[$\theta^i(t)$] for i=1, 2, . . . , u. Note that β<$2^u$ and $\beta_i$=0 for i≥u. The polynomial set $\{\Theta^1(t), \Theta^2(t), \ldots, \Theta^u(t)\}$ needs to be precomputed and stored. The precomputation can be done in the Preprocessing with n phase: Starting with multiplying $\theta^1(t)$ (which is θ(t) of the SMM) by powers of 2 after finding $v_0$. We then apply the DFT function to these polynomials in order to get $\Theta^i(t)$=DFT[$\theta^i$(t)] for i=1, 2, . . . , u. With this adjustment a better bound for b could be given as $$b^2 \log_2(b) < \frac{3q}{s^3}. \tag{3}$$

This bound gives us the improved parameters which are tabulated in Table 5 below.

TABLE 5

Improved parameter selection.

| Bits k | Ring q | DFT d | Root w | Wordsize u | Words s |
|---|---|---|---|---|---|
| 540 | $(2^{59}+1)/3$ | 59 | 2 | 19 | 30 |
| 564 | $2^{47}-1$ | 94 | −2 | 12 | 47 |
| 570 | $2^{59}-1$ | 59 | 2 | 19 | 30 |
| 620 | $2^{61}-1$ | 61 | 2 | 20 | 31 |
| 672 | $2^{64}+1$ | 64 | 4 | 21 | 32 |
| 1,098 | $2^{61}-1$ | 122 | 2 | 18 | 61 |
| 1,120 | $2^{79}-1$ | 79 | 2 | 28 | 40 |
| 1,216 | $2^{64}+1$ | 128 | 2 | 19 | 64 |
| 2,054 | $2^{79}-1$ | 158 | 2 | 26 | 79 |
| 2,160 | $2^{107}-1$ | 107 | 2 | 40 | 54 |
| 3,200 | $2^{128}+1$ | 128 | 4 | 50 | 64 |
| 4,173 | $2^{107}-1$ | 214 | −2 | 39 | 107 |
| 6,272 | $2^{128}+1$ | 256 | 2 | 49 | 128 |

Furthermore, in Tables 4 & 5, there are two important issues that should be considered for an efficient design. First issue is the number of words (s) or the DFT length (d) which are related to one another by s=⌈d/2⌉. Observe that the maximum modulus size is given as k=su. Moreover, the loop in the SMM algorithm runs d times. Therefore, a decrease in d is desirable for some designs even it is at a cost of using larger rings (q) and requiring some more storage space. In Table 6, we demonstrate parameters of this nature.

TABLE 6

Decreasing d.

| Bits k | Ring q | DFT d | Root w | Wordsize u | Words s |
|---|---|---|---|---|---|
| 540 | $(2^{115}-1)/31$ | 23 | 32 | 45 | 12 |
| 560 | $(2^{93}+1)/9$ | 31 | 64 | 35 | 16 |
| 608 | $2^{96}+1$ | 32 | 64 | 38 | 16 |
| 1,024 | $(2^{155}+1)/33$ | 31 | 1024 | 64 | 16 |
| 1,122 | $(2^{129}+1)/9$ | 43 | 64 | 51 | 22 |
| 2,150 | $(2^{129}+1)/9$ | 86 | 64 | 50 | 43 |

The second issue is the wordsize u which determines the maximum modulus size k as k=su and the number of elements in the set $\{\Theta^1(t), \Theta^2(t), \ldots, \Theta^u(t)\}$ which needs to be stored. For instance, in the ring q=$2^{47}-1$, the value of u=12 implies that $\{\Theta^1(t), \Theta^2(t), \ldots, \Theta^{12}(t)\}$ need to be stored. Here $\Theta^i(t)$ is a sequence of length 86 whose elements are from the ring q=$2^{47}-1$ for all i=1, 2, . . . , 12. This storage requirements of the above strategy can be excessive, however, a hybrid strategy is also possible. This can be summarized with the following equation $$\beta \cdot \Theta(t) = \beta' \cdot \Theta^1(t) + \sum_{i=u'}^{u} \beta_i \cdot \Theta^i(t),$$

where β'=β mod $2^{u'}$ and $\beta_i$ stands for binary digits of β÷$2^{u'}$ for some 0≤u'≤u.

2.8 The Use of Chinese Remainder Theorem (CRT)

In many situations it is desirable to break a congruence mod n into a system of small congruences mod factors of n. Once computations are performed in the small factor rings, by using CRT, the resultant system of congruences is replaced by a single congruence under certain conditions.

Chinese Remainder Theorem. For i≥2, let $p_1, p_2, \ldots, p_l$ be non-zero integers which are pairwise relatively prime: gcd($p_i$, $p_i$)=1 for i≠j. Then, for any integers $a_1, a_2, \ldots, a_l$, the system of congruences $$x \equiv a_1 \bmod p_1, x \equiv a_2 \bmod p_2, \ldots, x \equiv a_l \bmod p_l,$$

has a solution, and this solution is uniquely determined modulo $p_1 p_2 \ldots p_l$. We rather interested in computation (lift) of final congruence instead of proving CRT. Although there are more efficient ways of lifting, we consider the single-radix conversion (SRC) method. Going back to the general system, SRC algorithm computes x using the following summation for given $a_1, a_2, \ldots, a_l$ and $p_1, p_2, \ldots, p_l$.

$$x = \sum_{i=1}^{l} a_i c_i n'_i (\bmod n), \text{ where } n'_i = p_1 p_2 \ldots p_{i-1} p_{i+1} \ldots p_l = \frac{n}{p_i} \quad (4)$$

and $c_i$ is the multiplicative inverse of $n'_i \bmod p_i$.

When the SME is considered CRT can be used in two different ways. The first one is for degree where the second one is for radius. We start with the first one.

2.8.1 CRT for Degree

When n is composite number such as the RSA modulus n, the CRT is very beneficial if the prime factorization of n is known (e.g. RSA decryption). This method is easily adopted to SME.

Suppose that $n=p_1 p_2$ is a typically RSA modulus with two large distinct prime factors $p_1$ and $p_2$. The computation $m^e \bmod n$ can be put into the system of two small congruences as follows:

$$m_1 := c^e \bmod p_1$$

$$m_2 := c^e \bmod p_2$$

However, applying Fermat's theorem to the exponents, we only need to compute $$m_1 := c^{e_1} \bmod p_1$$

$$m_2 := c^{e_2} \bmod p_2$$

where $e_1 := e \bmod(p_1-1)$ and $e_2 := e \bmod(p_2-1)$.

Observe that the computation of $m_1$ and $m_2$ is performed by using the two separate SME with inputs $m_1, e_1$ and $m_2, e_2$ respectively and when they are computed, proceeding with the SRC algorithm, we achieve m by using the Sum (4)

$$m = m_1 c_1 p_2 + m_2 c_2 p_1 \bmod n \quad (5)$$

where $c_1 = p_2^{-1} \bmod p_1$ and $c_2 = p_1^{-1} \bmod p_2$.

2.8.2 CRT for Radius

CRT is proposed to use for integer multiplication by J. M. Pollard [6] and independently by A. Schönhage and V. Strassen [7] who further recommend to use FFT over Fermat rings $\mathbb{Z}_q$ with $q=2^{2^r}+1$ and $d=2^r$ for some r>0, they proved the famous time bound O(n log n log log n) for integer multiplication, with some care their ideas can be applied to spectral modular algorithms.

Let us give an example; suppose that $x=10+5t+t^2$ and $y=2+3t+3t^2$, convolving x and y gives $$z = x \odot y = 20 + 9t + 20t^2 + 24t^3 + 9t^4 \bmod 31$$

If the same computation is done modulo 2

$$z = x \odot y = 0 + t + 0 \cdot t^2 + 0 \cdot t^3 + t^4 \bmod 2$$

is computed and this suffices to recover the real coefficients z=(20, 40, 51, 24, 9) from the congruences z=(20, 9, 20, 24, 9)mod 31 and z=(0, 0, 1, 0, 1)mod 2 by using CRT on the coefficients. For instance, the second term can be found by solving the congruences $$z_2 \equiv 9 \bmod 31, \text{ and } z_2 \equiv 0 \bmod 2 \text{ which gives } z_2 \equiv 40 \bmod 62$$

by using the Equation (5).

When it comes to the spectral modular operations the methodology changes slightly. One has to recover the actual least significant time digit at every step of the reduction process.

Let $p_1, p_2, \ldots, p_l$ be positive, pairwise relatively prime numbers such that $p_1 p_2 \ldots p_l > q$. Moreover, assume that for all $j=1, 2, \ldots, l$ there exists a length $d_j$ DFT over $\mathbb{Z}_{p_j}$ such that $d_j \geq d$. Let for $j=1, 2, \ldots, l$ $$x_j(t) = x_{j0} + x_{j1}t + \ldots + x_{j(d_j-1)}t^{d_j-1} \equiv x(t) \bmod p_j,$$

$$y_j(t) = y y_{j0} + j_{j1}t + \ldots + y_{j(d_j-1)}t^{d_j-1} \equiv y(t) \bmod p_j,$$

$$n_j(t) = n_{j0} + n_{j1}t + \ldots + n_{j(d_j-1)}t^{d_j-1} \equiv n(t) \bmod p_j$$

be the transform pairs of $X_j(t), Y_j(t)$, and $N_j(t)$ respectively. If $X(t)=(X_1(t), X_2(t), \ldots, X_{l-1}(t))$ and $Y(t)=(Y_1(t), Y_2(t), \ldots, Y_{l-1}(t))$ stand for vectors of spectral polynomials, the following procedure computes $Z(t)=(t),(Z_1(t), Z_2(t), \ldots, Z_{l-1}(t))$.

1: $Z(t) := X(t) \odot Y(t)$
2: $\alpha := (0, 0, \ldots, 0)$, vector zero of dimension l
3: for i=0 to d−1
4: for j=1 to l
5: $z_{j0} := d_j^{-1} \cdot (Z_{j0} + Z_{j1} + \ldots + Z_{jd}) \bmod p_j$
6: end for
7: $z_0 := \sum_{j=1}^{l} z_{j0} c_j p'_j (\bmod q)$
8: for j=1 to l
9: $\beta_j := (-(z_0 + \alpha_j) \bmod b) \bmod p_j$
10: $\alpha_j := (z_{0j} \alpha_j + \beta_j)/b \bmod p_j$
11: $Z_j(t) := Z_j(t) + \beta_j \cdot N_j(t) \bmod p_j$
12: $Z_j(t) := Z_j(t) - (z_{0j} + \beta_j)(t) \bmod p_j$
13: $Z_j(t) := Z_j(t) \odot \Gamma_j(t) \bmod p_j$
14: end for
15: end for
16: $Z(t) := Z(t) + \alpha(t)$
17: return Z(t)

Once $Z(t)=(Z_1(t), Z_2(t), \ldots, Z_{l-1}(t))$ is computed, after applying the inverse DFT, one recovers $z(t)=x(t) \odot y(t)$ from small congruences or in case of an exponentiation keep using the above core consecutively as we described in Section 2.2.

In Tables 20, 21A and 21B in the Appendix Section of this document, some nice rings that CRT can be applied. As before most popular RSA sizes are targeted.

3 SPECTRAL ARITHMETIC FOR EXTENSION FIELDS

3.1 Binary Extension Fields

In this section we describe methods of carrying arithmetic for binary extension fields by using spectral techniques. DFT and convolution is used to compute the multiplications in the binary extension field $GF(2^k)$ for some k>0.

One way of representing the elements of $GF(2^k)$ is by binary polynomials of degree k−1 or less. If k is a composite number, i.e. k=su for some integers s and u, the field $GF(2^k)$ is an extension field for $GF(2^u)$. Since $GF(2^k)$ is isomorphic to $GF((2^u)^s)$, the elements of $GF(2^k) \approx GF((2^u)^s)$ can also be represented by polynomials over $GF(2^u)$ of degree s−1 or less. That is equivalent to say that $GF((2^u)^s)$ is isomorphic to $GF(2^k)/(n(t))$ for some irreducible polynomial n(t) of degree s−1 over $GF(2^u)$.

It is possible to embed the extension fields into some ring structure that admits a DFT transform. Let $$a(t) = \sum_{i=0}^{s-1} a_i t^i = a_0 + a_1 t + a_2 t^2 + \ldots + a_{s-1} t^{s-1}, \ a_i \in GF(2^u),$$

$R := Z_2[\gamma]/(f(\gamma))$ be a polynomial ring for some binary polynomial $f(\gamma)$ of degree v (not necessarily irreducible) and w be a principal s root of unity in R. Then one can define the transform of the sequence $(a_i)$ $(0 \le i \le s-1)$ of members of R to be the sequence $(A_i)$ where $$A_i = \sum_{j=0}^{s-1} a_j \cdot w^{ij} \quad (6)$$

This is analogous to DFT over finite integer rings but here the operations are carried over polynomial ring R instead of in the integer ring $Z_q$.

The inverse transform to (6) is given by $$a_i = d^{-1} \cdot \sum_{j=0}^{s-1} A_j \cdot w^{-ij}$$

The inverse DFT map is well defined if
  The multiplicative inverse of d exists in R, which implies gcd (d, 2)=1.
  A principal dth root of unity exists in R, which requires that d divides $|R|-1$ where $|R|$ denotes the order of the ring R (i.e. the number of elements of R) for every prime p divisor of $|R|-1$. We denote the principal dth root of unity with w.
As before, we will use a polynomial notation;

$A(t) = DFT_d^w[a(t)], a_i \in GF(2^u)$ and $A_i \in R$ denotes the d-point DFT using the dth root of w with inverse transform denoted by $a(t) = IDFT_d^w[A(t)]$ (or simply as $a(t) = IDFT[A(t)]$).

3.2 Spectral Modular Multiplication for Binary Extension Fields ($SMM\_2^k$)

We describe the $SMM\_2^k$ method as an adaptation of the SMM to binary extension fields. We try to use the same notation for simplicity but be aware that since the underlying structure is a polynomial rings, most of the time a polynomial arithmetic is used for computations. In our presentation we make use of the following polynomial in our operations $\Gamma(t) = 1 + w^{-1}t + w^{-2}t^2 + \ldots + w^{-(d-1)}t^{d-1}$.

The defining polynomial n(t) might be a special irreducible polynomial in order to have some simplified reductions. Our assumption is that n(t) is either a trinomial or a pentanomial. Let $n_0$ denote the constant term of n(t), Since $\gcd(n_0, \gamma^u) = 1$, let $v_0$ be the multiplicative inverse of $n_0$ modulo $\gamma^u$, i.e., $v_0 = n_0^{-1} (\text{mod } \gamma^u)$.

Whenever n(t) is chosen as a trinomial or a pentanomial having $n_0 \ne 1$. We need to use some multiples of n(t) in our method, which we denote by θ, and is derived from n(t) such that $\theta = v_0 n(t)$.

Note that since $v_0 n_0 = 1$ (mod $\gamma^u$), the constant term of θ becomes 1, i.e., $\theta_0 = 1$. The inverse $v_0 = n_0^{-1}$ (mod $\gamma^u$) can be computed using the extended polynomial Euclidean algorithm.

TABLE 7

The symbols used in the $SMM\_2^k$ method.

| Symbol | Meaning | Relationship |
|---|---|---|
| A(t) | DFT of an input polynomial a(t) | $DFT_d^w[a(t)]$ |
| k | size of the original field | $GF(2^k)$ |
| s | Number of coefficients in a(t) | k = su, i.e. $GF(2^k) \approx GF((2^u)^s)$ |
| u | size of a single coefficient | k = su, i.e. $GF(2^k) \approx GF((2^u)^s)$ |
| v | bit size of ring R | $2^{v-1} \le |R| \le 2^v$ |
| n(t) | defining polynomial of $GF((2^u)^s)$ | $GF((2^u)^s) \approx GF(2^k)/(n(t))$ |
| f(γ) | defining polynomial of R | $R \approx Z_2/(f(\gamma))$ |
| d | Length of the DFT | $s = \lceil d/2 \rceil$ |
| R | Polynomial ring modulo f(γ) | $R \approx Z_2/(f(\gamma))$ |
| w | Principal dth root of unity in R | $w^d = 1$ (mod f(γ)) |
| $n_0$ | constant term of n(t) | $n_0 = n(0)$ |
| $v_0$ | Inverse of $n_0$ modulo $\gamma^u$ | $v_0 = n_0^{-1}$ (mod $\gamma^u$) |
| θ | $v_0$ multiple of n(t) | $\theta = v_0 n(t)$ and $\theta_0 = 1$ |
| ⊙ | Component-wise multiplication in $R^d$ | $c(t) = a(t) \odot b(t)$ |
| Γ(t) | $1 + w^{-1}t + \ldots + w^{-(d-1)}t^{d-1}$ | w is dth root of unity |
| $DFT_d^w[a(t)]$ | d-point DFT of a(t) in R | A(t) = DFT[a(t)] |
| $IDFT_d^w[A(t)]$ | Inverse DFT function | a(t) = IDFT[A(t)] |

In addition to the usual scalar multiplication, we will also utilize the component-wise multiplication of elements of $R^d$, and denote this operation with the symbol ⊙ as $c(t) = a(t) \odot b(t)$.

Given the vectors $a(t) = a_0 + a_1 t + \ldots + a_{d-1} t^{d-1}$ and $b(t) = b_0 + b_1 t + \ldots + b_{d-1} t^{d-1}$, the resulting vector after the ⊙ operation will be $c(t) = c_0 + c_1 t + \ldots + c_{d-1} t^{d-1}$ such that $c_i(\gamma) = a_i(\gamma) b_i(\gamma)$ (mod f(γ)) for i=0, 1, ..., d−1.

Note that here we use two indeterminate t and γ for representations; γ is the indeterminate that is used to represent the elements of the polynomial ring R where t is used for polynomial representation of sequences.

The $SMM\_2^k$ method takes two arguments, such as A(t) and B(t), and computes R(t) as the output. We will denote the operation using $R(t) = SMM\_2^k[A(t), B(t)]$.

The steps of the $SMM\_2^k$ method are given below. Recall that the steps of the algorithm are similar to SMM for integer rings, the main difference is the arithmetic. Since the underlying structure is a polynomial ring we use polynomial arithmetic for computations.

1: $R(t) = A(t) \odot B(t) (\text{mod } f(\gamma))$
2: $\alpha = 0$
3: for i=0 to d−1
4: $r_0(t) = d^{-1}(R_0 + R_1 + \ldots + R_{d-1}) (\text{mod } f(\gamma))$
5: $\beta(\gamma) = -(r_0(\gamma) + \alpha(\gamma)) (\text{mod } \gamma^u)$
6: $\alpha(\gamma) = (r_0(\gamma) + \alpha(\gamma) + \beta(\gamma))/\gamma^u$
7: $R(t) = R(t) + \beta \cdot \Theta(t) (\text{mod } f(\gamma))$
8: $R(t) = R(t) - (r_0(\gamma) + \beta(\gamma))(t)(\text{mod } f(\gamma))$
9: $R(t) = R(t) \odot \Gamma(t) (\text{mod } f(\gamma))$
10: end for
11: return R(t)

We remark that in Step 8 $(r_0(\gamma) + \beta(\gamma))(t)$ is a notation for a polynomial with same coefficients of degree d−1. That is $(r_0(\gamma) + \beta(\gamma))(t) = (r_0(\gamma) + \beta(\gamma)) + (r_0(\gamma) + \beta(\gamma))t + \ldots + (r_0(\gamma) + \beta(\gamma))t^{d-1}$ Observe that the multiplication of Step 7 can be replaced by $$\beta \cdot \Theta(t) = \sum_{i=1}^{u} \beta_i \cdot \Theta^i(t). \quad (7)$$

Here the set $\{\Theta^1(t), \Theta^2(t), \ldots, \Theta^u(t)\}$ is the transform of the set $\{\theta^1(t), \theta^2(t), \ldots, \theta^u(t)\}$ where $\theta^i(t)$ is the polynomial such that $\theta_0^i(\gamma)=\gamma^{i-1} \in R$ for $i=1, 2, \ldots, u$. This modification is similar to the one described in Section 2.7 and improves the parameter selection. Since we work over the field $Z_2$, the arithmetic is carry free. In fact this makes the relation between the parameters s, u and v simpler (recall that $GF(2^k) \approx GF((2^u)^s)$).

The relations for SMM_$2^k$ and improved SMM_$2^k$ can be given as $4us \le v$ and $2us \le v$ respectively.

Remark that the choice of $f(\gamma)$ is very important for realizations. While working with integers for DFT function the underlying rings are chosen as Fermat or Mersenne rings, moreover the principal root of unity is picked as a power of two in order to make the computations as simple as possible. Similar simple constructions are possible while working with DFT over polynomial ring R. For instance, if $f(\gamma)$ is irreducible R becomes a field and many methods for efficient arithmetic can be emerged in this situation. We start with the simplest selections of the polynomial $f(\gamma)$.

3.2.1 Spectral Arithmetic Over the Polynomial Rings

The most convenient choice of $f(\gamma)$ would be the polynomials of type $\gamma^n-1$. Note that $\gamma^n-1$ is not irreducible over $Z_2$ so $R:=Z_2[\gamma]/(\gamma^n-1)$ is a ring with multiplicative set order $2^n-1$. In these rings the arithmetic corresponds to ones complement polynomial arithmetic.

As before, our primary objective is to turn the multiplications with root of unity to circular shifts so we pick $w=\gamma$. The suitable rings that admit the DFT structure with these choices are tabulated in Tables 8 and 9. Observe that k targets key sizes of popular cryptosystems.

TABLE 8

Standard Parameter Selection for SMM_$2^k$.

| Bits k | Ring f($\gamma$) | Ring q | DFT d | Root w | Wordsize u | Words s |
|---|---|---|---|---|---|---|
| 105 | $\gamma^{29}-1$ | $2^{29}-1$ | 29 | $\gamma$ | 7 | 15 |
| 171 | $\gamma^{37}-1$ | $2^{37}-1$ | 37 | $\gamma$ | 9 | 19 |
| 210 | $\gamma^{41}-1$ | $2^{41}-1$ | 41 | $\gamma$ | 10 | 21 |
| 242 | $\gamma^{43}-1$ | $2^{43}-1$ | 43 | $\gamma$ | 11 | 22 |
| 288 | $\gamma^{47}-1$ | $2^{47}-1$ | 47 | $\gamma$ | 12 | 24 |
| 351 | $\gamma^{53}-1$ | $2^{53}-1$ | 53 | $\gamma$ | 13 | 27 |
| 450 | $\gamma^{59}-1$ | $2^{59}-1$ | 59 | $\gamma$ | 15 | 30 |
| 578 | $\gamma^{67}-1$ | $2^{67}-1$ | 67 | $\gamma$ | 17 | 34 |

TABLE 9

Improved Parameter Selection for SMM_$2^k$.

| Bits k | Ring f($\gamma$) | Ring q | DFT d | Root w | Wordsize u | Words s |
|---|---|---|---|---|---|---|
| 210 | $\gamma^{29}-1$ | $2^{29}-1$ | 29 | $\gamma$ | 14 | 15 |
| 240 | $\gamma^{31}-1$ | $2^{31}-1$ | 31 | $\gamma$ | 15 | 16 |
| 342 | $\gamma^{37}-1$ | $2^{37}-1$ | 37 | $\gamma$ | 18 | 19 |
| 420 | $\gamma^{41}-1$ | $2^{41}-1$ | 41 | $\gamma$ | 20 | 21 |
| 702 | $\gamma^{53}-1$ | $2^{53}-1$ | 53 | $\gamma$ | 26 | 27 |

3.2.2 Spectral Arithmetic Over the Finite Fields

In general the selection of $f(\gamma)=\gamma^n-1$ and $w=\gamma$ gives the simplest arithmetic but in some cases different $f(\gamma)$ may be extremely useful. For instance, let $w=\gamma$ and $f(\gamma)=1+\gamma+\gamma^2+\ldots+\gamma^u$ (i.e. All-One-Polynomial (AOP)) be an irreducible polynomial. In [2] it is shown that the arithmetic in R with this selection emerges an AOP reduction which is as simple as a trinomial reduction. For $w=\gamma$ the roots of unity set is given as follows $$\{\gamma, \gamma^2, \ldots, \gamma^{u-1}, 1+\gamma+\gamma^2+\ldots+\gamma^{u-1}\} \quad (8)$$

Note that $f(\gamma)$ is chosen to be an irreducible polynomial, thus R is isomorphic to the finite field $GF(2^u)$. one can realize the ring R as a vector space over the field $GF(2)$ and consider a suitable basis for the computations. A basis of the form $$N=\{\alpha, \alpha^q, \ldots, \alpha^{q^{n-1}}\} \quad (9)$$

is called a normal basis for $GF(2^u)$ over $GF(2)$. When normal basis representation is used squaring operation corresponds to a cyclic shift. This is very important for realizations of exponentiation using the repeated square and multiply method.

For every finite field there exists a normal basis, in fact these basis are not unique. One way of stating the difference between these basis is that they may have different complexities for the multiplication operation. Those ones with the minimal complexity are the most important ones for computations (also called optimal normal basis). For our purposes a specific class of optimal normal basis are very special, these basis are called type I optimal basis. In construction of type I optimal basis $\alpha=\gamma$ is chosen to be the principal root of unity therefore the set (9) and root of unity set (8) are equal with a different order. By such a selection of basis, apart from easy squaring, multiplications with roots of unity corresponds to shifts without any reduction. Unfortunately not every field has an optimal normal basis since $\alpha=\gamma$ is not a principal root of unity for every choice of v for $GF(2^v)$. In Table 10 we tabulate the finite fields having type I optimal basis.

TABLE 10

Values at which Type I optimal normal basis exist.

| n | 4 | 10 | 12 | 18 | 28 | 36 | 52 | 58 | 60 | 100 | 106 | 130 |
|---|---|---|---|---|---|---|---|---|---|---|---|---|

If the parameter selection is reconsidered one can have Tables 11 and 12 for SMM_$2^k$ algorithm. Note that AOP(m) represents all-one-polynomial having degree m.

TABLE 11

Parameter Selection for SMM_$2^k$ over a Finite Field with ONB.

| Bits k | Ring f($\gamma$) | Ring q | DFT d | Root w | Wordsize u | Words s |
|---|---|---|---|---|---|---|
| 98 | AOP(28) | $GF(2^{28})$ | 28 | $\gamma$ | 7 | 14 |
| 162 | AOP(36) | $GF(2^{36})$ | 36 | $\gamma$ | 9 | 18 |
| 364 | AOP(52) | $GF(2^{52})$ | 52 | $\gamma$ | 13 | 26 |
| 406 | AOP(58) | $GF(2^{58})$ | 58 | $\gamma$ | 14 | 29 |
| 450 | AOP(60) | $GF(2^{60})$ | 60 | $\gamma$ | 15 | 30 |

TABLE 12

Improved Parameter Selection for SMM_$2^k$ over a Finite Field with ONB.

| Bits k | Ring f($\gamma$) | Ring q | DFT d | Root w | Wordsize u | Words s |
|---|---|---|---|---|---|---|
| 196 | AOP(28) | $GF(2^{28})$ | 28 | $\gamma$ | 14 | 14 |
| 324 | AOP(36) | $GF(2^{36})$ | 36 | $\gamma$ | 18 | 18 |
| 676 | AOP(52) | $GF(2^{52})$ | 52 | $\gamma$ | 26 | 26 |

TABLE 12-continued

Improved Parameter Selection for SMM_$2^k$ over a Finite Field with ONB.

| Bits k | Ring f(γ) | Ring q | DFT d | Root w | Wordsize u | Words s |
|---|---|---|---|---|---|---|
| 841 | AOP(58) | GF($2^{58}$) | 58 | γ | 29 | 29 |
| 900 | AOP(60) | GF($2^{60}$) | 60 | γ | 30 | 30 |

3.3 Spectral Modular Multiplication for Extension Fields with Small Characteristics (SMM_$q^k$)

In the previous section we presented spectral algorithms for binary extension fields. Spectral multiplication can be extremely efficient for extension fields having small characteristics. By "small" we mean the typical wordsize of todays architectures. For instance if the field GF($q^k$) is considered we assume $2^7 < q < 2^{64}$.

Let $$a(t) = a_0 + a_1 t + a_2 t^2 + \ldots + a_{k-1} t^{k-1}, \; a_i \in GF(q)$$

be a polynomial that represents an element of GF($q^k$) and w∈GF(q) be a dth primitive root of unity for d>2k. We define the DFT of the polynomial a(t) with the polynomial A(t) such that $$A_i = \sum_{j=0}^{d-1} a_j \cdot w^{ij} \qquad (10)$$

As before the conditions for the existence of the DFT map is guaranteed by the existence of $d^{-1}$ (i.e. gcd(d,q)=1 and this is given since q is a prime). Since the arithmetic is modulo q there exist no carries and overflows hence the Spectral Modular Multiplication for Extension fields (SMM_$q^k$) having small characteristic is simpler.

Let $a(t) = a_0 + a_1 t + a_2 t^2 + \ldots + a_{k-1} t^{k-1}$, and $b(t) = b_0 + b_1 t + b_2 t^2 + \ldots + b_{k-1} t^{k-1}$ be in GF($q^k$) and A(t) and B(t) be their transform pairs respectively. We present the SMM_$q^k$ method $$R(t) = SMM\_q^k[A(t), B(t)]$$

as follows:

1: R(t)=A(t)⊙B(t)(mod q)
2: for i=0 to s−1 (where s=⌈d/2⌉)
3: $r_0 = d^{-1}(R_0 + R_1 + \ldots + R_{d-1})$(mod q)
4: β=−$r_0$ (mod q)
5: R(t)=R(t)+β·Θ(t)(mod q)
6: R(t)=R(t)⊙Γ(t)(mod q)
7: end for
8: return R(t)

Remark. We need to say that like any spectral core described in this document the above algorithm describes a Montgomery type reduction which needs inputs in Montgomery form, i.e. R(t) is the transform pair of r(t)=a(t)·b(t)·$t^{-s}$.

Since the elements of GF($q^k$) naturally mapped into the Fourier ring $Z_q^d$ and no overflows occurs, a standard reduction is equally applicable while using spectral methods for GF($q^k$). This could save significant resources by simply not using the Montgomery representation conversions.

Therefore, if mirror image of a(t) and b(t) are used as inputs to SMM_$q^k$, in other words, if $a(t) = a_0 t^{k-1} \pm a_1 t^{k-2} + \ldots + a_{k-2} t + a_{k-1}$, and $b(t) = b_0 t^{k-1} + b_1 t^{k-2} + \ldots + b_{k-2} t + b_{k-1}$, the output of SMM_$q^k$ algorithm, R(t), simply gives the transform pair of r(t)=a(t)·b(t). The reason why we use the mirror image is because we reduce starting from the most significant coefficients unlike to Montgomery approach. A last remark is θ(t) should be chosen accordingly when this approach is employed.

When it comes to the relations between the parameters s, u and v once again everything is simplified by the absence of the overflows. An improved method as described with Equation (7) does not serve any bound advantage over regular SMM_$q^k$. For both algorithm we choose u=$\log_2 q$=v. In Table 13 we tabulate some nice rings that target some popular key sizes k with SMM_$q^k$.

TABLE 13

Parameter Selection for SMM_$q^k$.

| Bits s·u | Ring q | DFT d | Root w | Wordsize u | Words s |
|---|---|---|---|---|---|
| 153 | $2^{17}-1$ | 17 | 2 | 17 | 9 |
| 169 | $2^{13}-1$ | 26 | −2 | 13 | 13 |
| 190 | $2^{19}-1$ | 19 | 2 | 19 | 10 |
| 256 | $2^{16}+1$ | 32 | 2 | 16 | 16 |
| 289 | $2^{17}-1$ | 34 | −2 | 17 | 17 |
| 361 | $2^{19}-1$ | 38 | −2 | 19 | 19 |
| 496 | $2^{31}-1$ | 31 | 2 | 31 | 16 |
| 961 | $2^{31}-1$ | 62 | −2 | 31 | 31 |

Sometimes choosing the prime q as a divisor of a number of the form $2^v \pm 1$ can be useful for finding more suitable structures to perform SMM_$q^k$ method. In general, arithmetic in $Z_q$ is difficult; however, since q is a factor of $2^v \pm 1$, the arithmetic modulo q can be carried in the ring $Z_{2^v \pm 1}$. The actual result can be found with a final modulo q reduction. Such an approach simplifies the overall computation. In Table 14 we tabulated some suitable rings having such a property.

TABLE 14

Parameter Selection for some Pseudo Mersenne and Fermat Rings.

| Bits s·u | Ring q | DFT d | Root w | Wordsize u | Words s |
|---|---|---|---|---|---|
| 150 | $(2^{20}+1)/17$ | 20 | 4 | 15 | 10 |
| 170 | $(2^{19}+1)/3$ | 19 | 4 | 17 | 10 |
| 204 | $(2^{23}-1)/47$ | 23 | 2 | 17 | 12 |
| 252 | $(2^{23}+1)/3$ | 23 | 4 | 21 | 12 |
| 255 | $(2^{17}+1)/3$ | 34 | −2 | 15 | 17 |
| 300 | $(2^{20}+1)/17$ | 40 | −2 | 15 | 20 |
| 322 | $(2^{28}+1)/17$ | 28 | 4 | 23 | 14 |
| 323 | $(2^{19}+1)/3$ | 38 | −2 | 17 | 19 |
| 352 | $(2^{32}+1)/641$ | 32 | 4 | 22 | 16 |
| 391 | $(2^{23}-1)/47$ | 46 | −2 | 17 | 23 |
| 464 | $(2^{31}+1)/3$ | 31 | 4 | 29 | 16 |
| 483 | $(2^{23}+1)/3$ | 46 | 2 | 21 | 23 |
| 644 | $(2^{28}+1)/17$ | 56 | 2 | 14 | 23 |
| 704 | $(2^{32}+1)/641$ | 64 | 2 | 22 | 32 |
| 899 | $(2^{31}+1)/3$ | 62 | 2 | 29 | 31 |

4 SPECTRAL POINT MULTIPLICATION FOR ELLIPTIC CURVE CRYPTOGRAPHY

In this section we demonstrate how SMM method can be used for performing elliptic curve point multiplication operation. Although our presentation reveals the curves over the prime fields, with minor changes the technique is completely applicable for curves over GF($q^k$) including the binary extensions. First we briefly describe elliptic curves over finite fields.

4.1 Elliptic Curves over Finite Fields

An elliptic curve E over a field GF($q^k$), (for a prime q>3) is determined by parameters a, b∈GF($q^k$) which satisfy $4a^3+$ $27b^2 \neq 0$. The curve consists of the set of solutions or points $\mathbb{P}=(x,y)$ for $x,y \in GF(q^k)$ to the equation $$y^2 = x^3 + ax + b \qquad (11)$$

together with an extra point $\mathbb{O}$ called the point at infinity. The set of points on E forms a group under the following addition rule: Let $(x_1,y_1) \in E(GF(q^k))$ and $(x_2,y_2) \in E(GF(q^k))$ be two points such that $x_1 \neq x_2$. Then, we have $(x_1,y_1)+(x_2,y_2)=(x_3,y_3)$, where $$\lambda = (y_2-y_1)(x_2-x_1)^{-1}$$

$$x_3 = \lambda^2 - x_1 - x_2,$$

$$y_3 = \lambda(x_1-x_3) - y_1.$$

Observe that all computations are performed within the finite field $GF(q^k)$. Therefore, the efficient finite field arithmetic is utmost interest for ECC. If the base field structure is chosen as a binary field extension the curve equation slightly changes because the characteristic $q=2$. The curve E with parameters $b \neq 0$, $a \in GF(2^k)$ consists of the set of pairs in $GF(2^k)$ satisfying the equation $$y^2 + xy = x^3 + ax^2 + b$$

together with an extra point $\mathbb{O}$. Once again, the set of points on E forms a group. The addition rule follows; let $(x_1,y_1) \in E(GF(2^k))$ and $(x_2,y_2) \in E(GF(2^k))$ be two points such that $x_1 \neq x_2$. Then, we have $(x_1,y_1)+(x_2,y_2)=(x_3,y_3)$, where $$\lambda = \frac{y_2+y_1}{x_2+x_1},$$

$$x_3 = \lambda^2 + \lambda + x_1 + x_2 + a,$$

$$y_3 = \lambda(x_1+x_3) + x_3 + y_1.$$

The above calculation of the pair $(x_3,y_3)$ is different from the case $q>3$. In fact, this is the main computational difference in practice. Therefore, a point multiplication method for $GF(2^k)$ can be achieved by simply reflecting the above point addition formula.

The security provided by ECC is guaranteed by the difficulty of the discrete logarithm problem in the elliptic curve group. The discrete logarithm problem is the problem of finding the least positive number, k, which satisfies the equation $$\mathbb{P}_1 = e \times \mathbb{P}_0 = \underbrace{\mathbb{P}_0 + \mathbb{P}_0 + \ldots + \mathbb{P}_0}_{e \text{ times}},$$

where $\mathbb{P}_0$ and $\mathbb{P}_1$ are points on the elliptic curve. Naturally, the basic computation (called point multiplication) in ECC is finding the eth (additive) power of an element $\mathbb{P}_0$ in the group. This involves additions, multiplications, and inversions of field elements in which are in the coordinates of the points. That is, it relies completely upon calculations in the underlying field, $GF(q^k)$.

Observe that for $k=1$, $GF(q^1)$ is a prime field and in Sections 2, we present our spectral algorithms as techniques for performing efficient modular exponentiation. We claim that the spectral methods can be employed for elliptic point multiplication likewise described for the modular exponentiation. Fortunately, point multiplication favors the efficiency since it is another operation which needs consecutive employment of multiplication.

As we mention before we describe the spectral point multiplication over the prime fields GF(q), before starting this construction we need to introduce a modification of the so called SMM algorithm.

4.2 Modified Spectral Modular Multiplication Algorithm

It turns out that the least magnitude residue representation of integers in the ring $Z_q$ is more suitable for applying the Spectral Modular Multiplication method in elliptic curve cryptography. We represent the integers in the ring $Z_q$ with the set $\{-q/2, \ldots, -1, 0, 1, \ldots, q/2\}$. In this convention, the modular reduction method picks values from the least magnitude set, e.g., 12 mod 7 is equal to −2 instead of 5. We make some small changes in the SMM method in order to utilize the least magnitude residues properly. The modified spectral multiplication algorithm is denoted with the following operation $$R(t) = SMM2[A(t), B(t)].$$

The detailed steps of the SMM2 method are given below.

1: $R(t) = A(t) \odot B(t) \pmod{q}$
2: $\alpha = 0$
3: for $i=0$ to $d-1$
4: $r_0 = d^{-1}(R_0 + R_1 + \ldots + R_{d-1}) \pmod q$
5: $\beta = r_0 + \alpha \pmod b$
6: $\alpha = (r_0 + \alpha)/b$
7: $R(t) = R(t) - \beta \cdot \Theta(t) \pmod q$
8: $R(t) = R(t) - (r_0 - \beta) \pmod q$
9: $R(t) = R(t) \odot \Gamma(t) \pmod q$
10: end for
11: return $R(t)$ We will now describe the spectral point multiplication method for elliptic curves. We would like to remark that different representations of points on elliptic curves brings various realizations of the elliptic curve system which are suitable for different purposes. The two common representations are deduced by presenting the curve in the affine and projective coordinates. The former gives a straightforward representation involving inversions in the finite field, while the latter replaces inversions by multiplications. In general, this is desired since the inversion operation in GF(q) is more time- and resource-intensive operation than the multiplication.

4.3 Spectral Projective Point Multiplication (SPPM)

We describe the spectral point multiplication method for projective coordinates. The SPPM method computes $\mathbb{Q} = e \times \mathbb{P}$ given the integer e and the point $\mathbb{P}$. The underlying field is a prime field GF(n) (i.e. n is a prime), and therefore, we need to setup a mod n spectral arithmetic as was the case for the modular exponentiation operation. The preprocessing step of the SPPM method is essentially the same the preprocessing step of the SMM method (Preprocessing with n): Given n, we need to compute $v_0$, $\theta$, $\Theta(t)$, $\lambda$, $\delta$, $\Delta(t)$, and $K(t)$. After these computations, we start the Preprocessing with $\mathbb{P}$ phase, and move into the Exponentiation Loop and Postprocessing phases.

Preprocessing with $\mathbb{P}$: Given $\mathbb{P} = (x,y,z)$, obtain $\mathbb{P}(t) = (x(t), y(t), z(t))$.

1. Compute the point $\mathbb{P}'(t) = (X(t), Y(t), Z(t)) = (DFT[x(t)], DFT[y(t)], DFT[z(t)])$.
2. Assign $\mathbb{Q}'(t) = \mathbb{O}'(t) = (0, K(t), 0)$. Note that $\mathbb{O} = (0,1,0)$ is the projective coordinate representation of the point at infinity and $\mathbb{O}'(t) = (0, K(t), 0)$ is its DFT.
3. Use the modified Spectral Modular Multiplication (SMM2) method to compute $\mathbb{P}'(t)=(\overline{X}(t),\overline{Y}(t),\overline{Y}(t))$ as follows $\overline{X}(t)=SMM2[X(t),\Delta(t)],$ $\overline{Y}(t)=SMM2[Y(t),\Delta(t)],$ $\overline{Z}(t)=SMM2[Z(t),\Delta(t)],$ 4. Use the SMM2 method to compute $\mathbb{Q}'(t)=(0,\overline{K}(t),0)$ such that $\overline{K}(t)=SMM2[K(t),\Delta(t)].$ Exponentiation Loop: The exponentiation operation is performed as soon as the j-bit exponent e is available. Let the binary expansion of e be $(e_{j-1} e_{j-2} \ldots e_1 e_0)_2$. The exponentiation operation needs $\mathbb{Q}'(t)$ and $\mathbb{P}'(t)$ in addition to the exponent e. The exponentiation method (the point multiplication) method relies on elliptic curve point doubling and point addition methods. Since we work in the spectral domain and in the projective coordinate systems, we name these methods as the Spectral Projective Point Doubling (SPPD) and the Spectral Projective Point Additions (SPPA) methods.

for i=j−1 downto 0

$\mathbb{Q}'(t)=SPPD[\mathbb{Q}'(t)]$ if $e_i=1$ then $\mathbb{Q}'(t)=SPPA[\mathbb{Q}'(t),\mathbb{P}'(t)]$ Postprocessing: After the additive exponentiation loop is completed, we will have a final value of $\mathbb{Q}'(t)=(\overline{X}(t),\overline{Y}(t),\overline{Z}(t)).$ This vector now needs to be brought back to the time domain.

1. Obtain $\mathbb{Q}'(t)=(X(t),Y(t),Z(t))$ using the SMM2 method by multiplying K(t) as $X(t)=SMM2[\overline{X}(t),K(t)],$ $Y(t)=SMM2[\overline{Y}(t),K(t)],$ $Z(t)=SMM2[\overline{Z}(t),K(t)],$ 2. Obtain $\mathbb{Q}(t)=(x(t),y(t),z(t))$ using the Inverse DFT function as follows $x(t)=IDFT[X(t)],$ $y(t)=IDFT[Y(t)],$ $z(t)=IDFT[Z(t)],$ Output: The point $\mathbb{Q}(t)=(x(t),y(t),z(t))$ is the output of the SPPM method, such that $\mathbb{Q}(t)=e\times\mathbb{P}(t).$ 4.4 Spectral Projective Point Addition (SPPA)

Let $\mathbb{P}_0(t)=(X_0(t),Y_0(t),Z_0(t))$ and $\mathbb{P}_1(t)=(X_1(t),Y_1(t),Z_1(t))$ be spectral representation of two points on an elliptic curve E. The SPPA algorithm computes the projective point addition $\mathbb{P}_2=\mathbb{P}_0+\mathbb{P}_1$ in the spectral domain. We will denote the operation using $\mathbb{P}_2(t)=(X_2(t),Y_2(t),Z_2(t))=SPPA[\mathbb{P}_0(t),\mathbb{P}_1(t)].$ The steps of the SPPA method are given below.

$\Psi_0(t)=SMM2[X_0(t),SMM2[Z_1(t),Z_1(t)]],$ $\Psi_1(t)=SMM2[SMM2[Y_0(t),Z_1(t)],SMM2[Z_1(t),Z_1(t)]],$ $\Psi_2(t)=SMM2[X_1(t),SMM2[Z_0(t),Z_0(t)]],$ $\Psi_3(t)=SMM2[SMM2[Y_1(t),Z_0(t)],SMM2[Z_0(t),Z_0(t)]],$ $\Psi_4(t)=\Psi_0(t)-\Psi_2(t),$ $\Psi_5(t)=\Psi_0(t)+\Psi_2(t),$ $\Psi_6(t)=\Psi_1(t)+\Psi_3(t),$ $\Psi_7(t)=\Psi_1(t)+\Psi_3(t),$ $Z_2(t)=SMM2[Z_0(t),SMM2[Z_1(t),\Psi_4(t)]],$ $X_2(t)=SMM2[\Psi_6(t),\Psi_6(t)]-SMM2[\Psi_5(t),SMM2[\Psi_4(t),\Psi_4(t)]],$ $\Psi_8(t)=SMM2[\Psi_5(t),SMM2[\Psi_4(t),\Psi_4(t)]]-2X_2(t),$ $2Y_2(t)=SMM2[\Psi_8(t),\Psi_6(t)]-SMM2[SMM2[\Psi_7(t),\Psi_4(t)],SMM2[\Psi_4(t),\Psi_4(t)]].$ 4.5 Spectral Projective Point Doubling (SPPD)

The SPPD algorithm computes the projective doubling $2\times\mathbb{P}_1(t)$ operation. We will denote the operation using $\mathbb{P}_2(t)=(X_2(t),Y_2(t),Z_2(t))=2\times\mathbb{P}_1(t)=SPPD[\mathbb{P}_1(t)].$ The steps are given below.

$\Psi_0(t)=3\cdot SMM2[X_1(t),X_1(t)]+\alpha\cdot SMM2[SMM2[Z_1(t),SMM2[Z_1(t),Z_1(t)]]],$ $Z_2(t)=2\cdot SMM2[Y_1(t),Z_1(t)],$ $\Psi_1(t)=4\cdot SMM2[X_1(t),SMM2[Y_1(t),Y_1(t)]],$ $X_2(t)=SMM2[\Psi_0(t),\Psi_0(t)]-2\Psi_1(t),$ $\Psi_2(t)=8\cdot SMM2[SMM2[Y_1(t),Y_1(t)],SMM2[Y_1(t),Y_1(t)]],$ $Y_2(t)=SMM2[\Psi_0(t),\Psi_0(t)-X_2(t)]-\Psi_2(t).$ 4.6 Spectral Affine Point Multiplication (SAPM)

If the affine coordinates used to represent the curve, the addition and doubling formulae get simpler but one needs to deal with the inversions in the finite field. The flow the point multiplication algorithm is same as the projective case with a fewer coordinates. The preprocessing step of the SAPM method is exactly the same the preprocessing step of the SPPM method: Given n, we need to compute $v_0$, $\theta$, $\Theta(t)$, $\lambda$, $\delta$, $\Delta(t)$, and K(t). After these computations, we start the Preprocessing with $\mathbb{P}$ phase, and move into the Exponentiation Loop and Postprocessing phases.

Preprocessing with $\mathbb{P}=(x,y)$: Given $\mathbb{P}$, obtain $\mathbb{P}(t)=(x(t),y(t))$.

1. Compute the point $\mathbb{P}'(t)=(X(t),Y(t))=(DFT[x(t)],DFT[y(t)])$.
2. Assign $\mathbb{Q}'(t)=\mathbb{O}'(t)=(0,K(t))$. Note that $\mathbb{O}=(0,1)$ is the projective coordinate representation of the point at infinity and $\mathbb{O}'(t)=(0,K(t))$ is its DFT.
3. Use the SMM2 method to compute $\overline{\mathbb{P}}(t)=(\overline{X}(t),\overline{Y}(t))$, where $\overline{X}(t)=SMM2[X(t),\Delta(t)],$ $\overline{Y}(t)=SMM2[Y(t),\Delta(t)].$ 4. Use the SMM2 method to compute $\mathbb{Q}'(t)=(\overline{K}(t),0)$ such that $\overline{K}(t)=SMM2[K(t),\Delta(t)].$ Exponentiation Loop: The exponentiation operation is performed as soon as the j-bit exponent e is available. Let the binary expansion of e be $(e_{j-1} \; e_{j-2} \ldots e_1 e_0)_2$. The exponentiation operation needs $\mathbb{Q}'(t)$ and $\mathbb{P}'(t)$ as input in addition to the exponent e.

for i=j−1 downto 0

$\mathbb{Q}'(t)$=SAPD[$\mathbb{Q}'(t)$]

if $e_i$=1 then $\mathbb{Q}'(t)$=SAPA[$\mathbb{Q}'(t),\mathbb{P}'(t)$]

Postprocessing: After the additive exponentiation loop is completed, we will compute the final value of $\mathbb{Q}'(t)=(\overline{X}(t), \overline{Y}(t))$. This vector will now be brought back to the time domain as follows.

1. Obtain $\mathbb{Q}'(t)=(X(t),Y(t))$ using the SMM2 method by multiplying K(t) as $X(t)$=SMM2[$\overline{X}(t),K(t)$], $Y(t)$=SMM2[$\overline{Y}(t),K(t)$].

2. Obtain $\mathbb{Q}(t)=(x(t),y(t))$ using the Inverse DFT function as follows $x(t)$=IDFT[$X(t)$], $y(t)$=IDFT[$Y(t)$].

Output: The point $\mathbb{Q}(t)=(x(t),y(t))$ is the output of the SPPM method, such that $\mathbb{Q}(t)=e\times\mathbb{P}(t)$.

4.7 Spectral Affine Point Addition (SAPA)

Let $\mathbb{P}_0(t)=(X_0(t),Y_0(t))$ and $\mathbb{P}_1(t)=(X_1(t),Y_1(t))$ be spectral representation of two points on an elliptic curve E. The SAPA algorithm computes the affine point addition $\mathbb{P}_2=\mathbb{P}_0+\mathbb{P}_1$ in the spectral domain. We will denote the operation using $\mathbb{P}_2(t)=(X_2(t),Y_2(t))$=SAPA[$\mathbb{P}_0(t),\mathbb{P}_1(t)$].

The steps of the SAPA method are given below;

$\Psi(t)$=SMM2[$Y_1(t)-Y_0(t),(X_1(t)-X_0(t))^{-1}$], $X_2(t)$=SMM2[$\Psi(t),\Psi(t)$]−$X_1(t)-X_0(t)$, $Y_2(t)$=SMM2[$X_0(t)-X_2(t),\Psi(t)$]−$X_2(t)-Y_0(t)$.

4.8 Spectral Affine Point Doubling (SAPD)

The SAPD algorithm computes the affine point doubling 2× $\mathbb{P}_1(t)$ operation. We will denote the operation using $\mathbb{P}_2(t)=(X_2(t),Y_2(t))=2\times\mathbb{P}_1(t)$=SAPD[$\mathbb{P}_1(t)$].

The steps are given below.

$\Psi(t)$=SMM2[$3X_0(t)+a(t),(2Y_1(t))_{-1}$], $X_2(t)$=SMM2[$\Psi(t),\Psi(t)$]−$2X_1(t)$, $Y_2(t)$=SMM2[$X_0(t)-X_2(t),\Psi(t)$]−$X_2(t)-Y_0(t)$.

4.9 Parameter Selection for Elliptic Curve Cryptography

In Section 2, we described the parameter selection methodology for the SME method enriched by some sample parameters giving the key sizes around the most popular key sizes. In this section, we will present some similar examples for the ECC. Practically, the SMM2 and SMM algorithms give the same bounds enforced by the inequalities (1) and (2). The improvements described in Section 2.7 are also applicable to SMM2 method. In Table 15, we demonstrate the suitable parameters for the SPM (valid for both PSPM and ASPM). We would like to add that the main characteristic of the ECC is having shorter key sizes ranges from 160 bits to 540 bits. Thus, these tables can be seen as a continuation of the parameter selection tables of Section 2.

TABLE 15

Standard and improved parameter selections for ECC.

| Bits k | Ring q | DFT d | Root w | Wordsize u | Words s |
|---|---|---|---|---|---|
| 176 | $2^{43}-1$ | 43 | 2 | 8 | 22 |
| 185 | $2^{37}-1$ | 74 | −2 | 5 | 37 |
| 190 | $(2^{38}-1)/3$ | 76 | −2 | 5 | 38 |
| 192 | $2^{47}-1$ | 47 | 2 | 8 | 24 |
| 234 | $(2^{51}-1)/7$ | 51 | 2 | 9 | 26 |
| 270 | $2^{53}-1$ | 53 | 2 | 10 | 27 |
| 384 | $2^{84}+1$ | 64 | 4 | 12 | 32 |
| 580 | $(2^{58}-1)/3$ | 116 | −2 | 10 | 58 |
| 171 | $(2^{37}+1)/3$ | 37 | 4 | 9 | 19 |
| 186 | $2^{31}-1$ | 62 | −2 | 6 | 31 |
| 190 | $2^{37}-1$ | 37 | 2 | 10 | 19 |
| 210 | $(2^{41}+1)/3$ | 41 | 4 | 10 | 21 |
| 224 | $2^{32}+1$ | 64 | 2 | 7 | 32 |
| 231 | $2^{41}-1$ | 41 | 2 | 11 | 21 |
| 264 | $2^{43}-1$ | 43 | 2 | 12 | 22 |
| 296 | $2^{37}-1$ | 74 | −2 | 8 | 37 |
| 405 | $(2^{53}+1)/3$ | 53 | 4 | 15 | 27 |
| 410 | $2^{41}-1$ | 82 | −2 | 10 | 41 |
| 540 | $(2^{59}+1)/3$ | 59 | 2 | 19 | 30 |
| 564 | $2^{47}-1$ | 94 | −2 | 12 | 47 |

5 HARDWARE ARCHITECTURES FOR SPECTRAL MODULAR ARITHMETIC

Recall that the core part of the SME, SPPM, SAPM methods consists of the SMM and SMM2 algorithms. These two multiplication algorithms (SMM and SMM2) are same except the representation set of $Z_q$. From a design point of view, this difference is quite insignificant, and can be dealt with in the circuit level.

Additionally, SMM_$2^k$ and SMM_$q^k$ methods described in Section 3 are the core computation for an elliptic curve point addition operation over extension fields. However we did not described them in detailed.

In this section, we describe the hardware architectures for all above cores including SMM, SMM_$2^k$ and SMM_$q^k$ methods by going through their steps, as described in previous sections. We start by giving a top level model which is common for all these methods in FIG. 7. In this architecture, the outputs of the convolution step (Step 1) feed the R MUXes. For the initial case, each MUX R chooses the input from Step 1, and then the reduction loop starts. The loop runs d times: at every run, the outputs of the processing units are passed to the interpolation and also fed back to the unit itself. The processing engine waits until some parameters are generated from the parameter generation logic. After the loop runs as specified with its index, the processing units from 0 to d−1 outputs the coefficient of the resultant spectral polynomial R(t). It is important to realize that in this architecture all processing units work in parallel.

Figure 7:
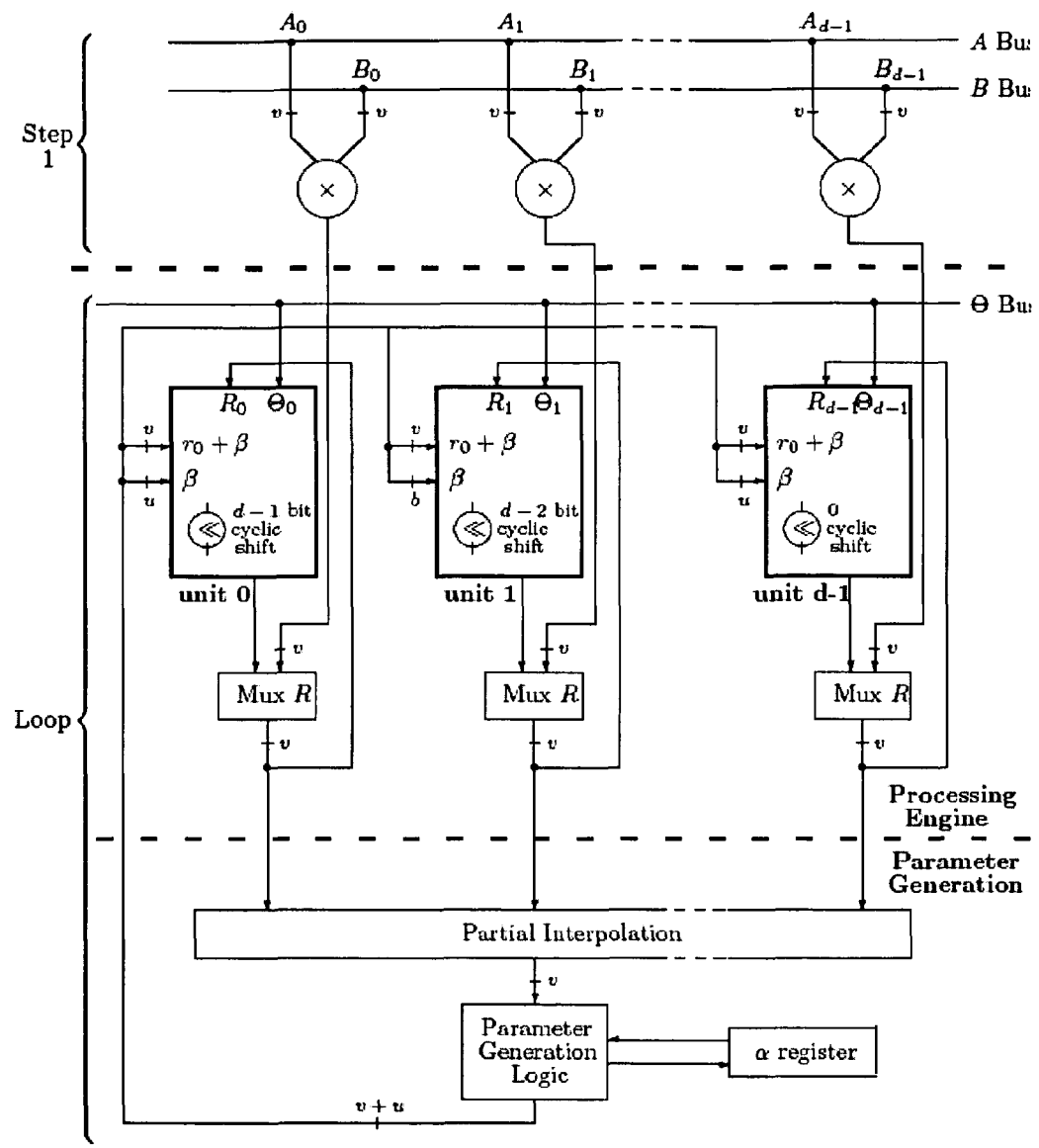
FIG. 7 illustrates a hardware architecture for SMM.

Now, it is time to demonstrate the low level architectures such that we describe how actually each box in FIG. 7 works. This is also the point where we particularly specify the implementations for different structures i.e. prime, binary extension and extension fields with mid-size characteristics.

5.1 Spectral Multiplication

In Step 1 of algorithms SMM, SMM_$2^k$ and SMM_$q^k$, the convolution property is employed. Given the vectors A(t) and B(t), we compute R(t) such that $R_i(\gamma)=A_i(\gamma)B_i(\gamma)(\bmod f(\gamma))$ for SMM_$2^k$ and $R_i=A_iB_i \pmod q$ for SMM and SMM_$q^k$ where i=0, 1, ..., d−1. This computation is accomplished using the hardware architecture given in FIG. 8.

Recall that our targeted rings are different for SMM, SMM_$2^k$ and SMM_$q^k$ hence the multipliers vary. We briefly describe these multipliers:

SMM_$2^k$ over polynomial rings with f($\gamma$)=$\gamma^n$−1: The multiplier is a v×v binary polynomial multiplication with a f($\gamma$)=$\gamma^n$−1 reduction. Note that this is very similar to one's complement arithmetic without any carry propagation.

SMM_$2^k$ over finite fields with f($\gamma$)=AOP(u): Since the set (8) and (9) are equal with a different order, the conversion between them is established using a permutation. Let an element a∈GF($2^k$)≈GF(($2^u$)$^s$) be expressed in type I optimal basis as $$a = \sum_{i=0}^{u-1} a_i \beta^{2^i}.$$

One can express a in the shifted polynomial basis as $$\bar{a} = \sum_{i=0}^{u-1} \bar{a}_i \beta^{i+1}.$$

The following permutation gives the conversion between these two basis:

$$\bar{a}_{(2^i-1) mod(m+1)} = a_1 \text{ for } i=0, 1, \ldots, m-1.$$

Therefore the multiplication of two elements with a type IONB representation can be performed by a polynomial multiplication with an AOP reduction after obtaining a shifted polynomial representation by using the above permutation. One has to apply an inverse permutation after the multiplication to obtain the result in normal basis form.

If the operands are same (i.e. the operation is a squaring) the multiplier is replaced by a bitwise circular shift of the binary vector, no reduction is needed.

SMM_$q^k$ over a mid-size characteristic ring: Recall that our targeted rings are the Mersenne or Fermat rings for which q is of the form $2^v$±1. Hence, these multiplications can be realized by employing v×v modulo multipliers and the complexities of these multipliers are not difficult from the usual integer multiplication.

SMM over an integer ring: Like as in SMM_$q^k$ case we use some Mersenne or Fermat rings. Hence, multiplications are realized by some modular multipliers.

5.2 Spectral Reduction

For simplicity, the reduction steps which correspond to the loop with i is divided into two parts:

Parameter Generation: Here, we compute the parameters $r_0$, $\alpha$, and $\beta$, and feed feed them to the main processing units.

Processing Engine: Basically we add a multiple of the modulus to the partial sum and then divide it by the base.

Figure 9:
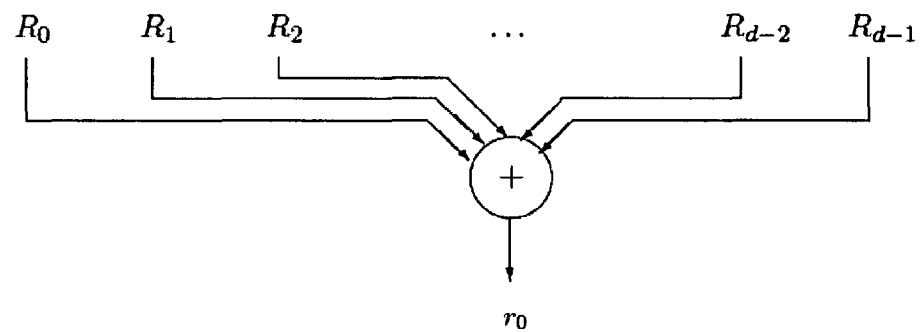
FIG. 9 illustrates partial interpolation for SMM_$2^k$.

SMM_$2^k$ over polynomial rings with f($\gamma$)=$\gamma^n$−1: We start with the parameter generation; Step 4 of SMM_$2^k$ corresponds to a partial interpolation in which a d-input XOR is performed in order to find the zeroth coefficient of the polynomial. Note that $d^{-1}$=1 since we work characteristic 2. FIG. 9 shows the architecture for these computations.

Figure 10:
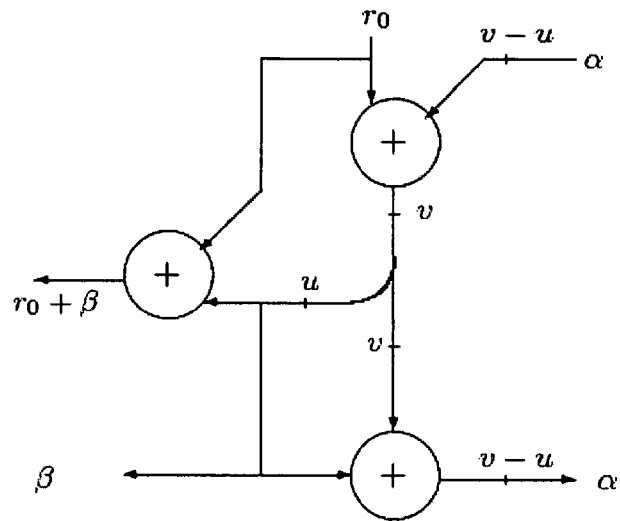
FIG. 10 illustrates parameter generation logic (PGL) for SMM_$2^k$.

Steps 5 and 6 of SMM_$2^k$ as seen in the FIG. 10 are called the Parameter Generation Logic (PGL) which computes the parameters $r_0$+$\beta$ and $\beta$. The adders seen in FIG. 10 are the usual v-bit XORs, obviously no reductions needed with these XORs.

Figure 11:
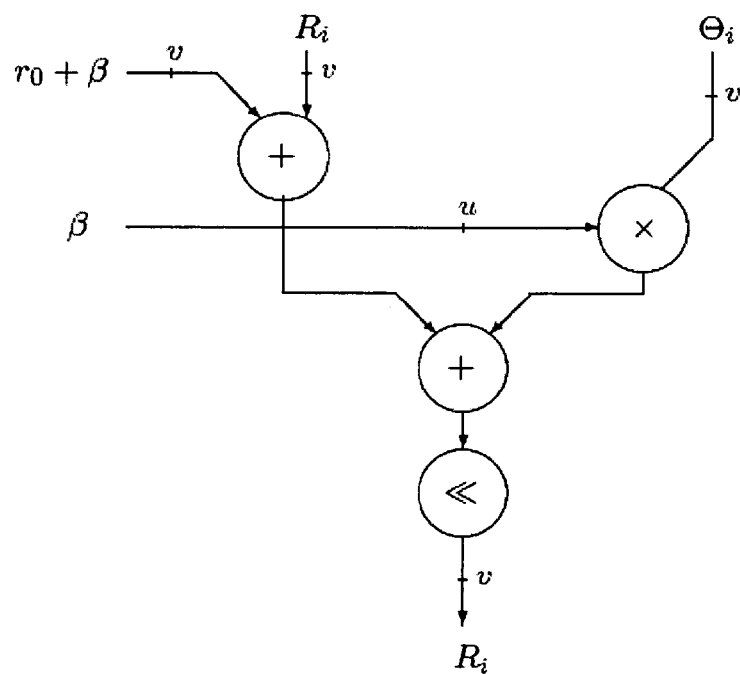
FIG. 11 illustrates a representative processing unit for SMM_$2^k$.

The Processing Engine is the most resource-consuming stage and it corresponds to Steps 7, 8, and 9 of SMM_$2^k$. In FIG. 11, we give the architecture of a single processing unit. The processing engine consists of d such units.

Both adders in FIG. 11 are v-bit XORs. The shift operation at the bottom of the figure corresponds to Step 9 of the SMM_$2^k$ core. As we pick w=$\gamma$, the multiplications with the coefficients of Γ(t) correspond to the constant d−1−i bit circular shifts for processing units $R_i$ where i=1, 2, . . . , d−1.

Figure 8:
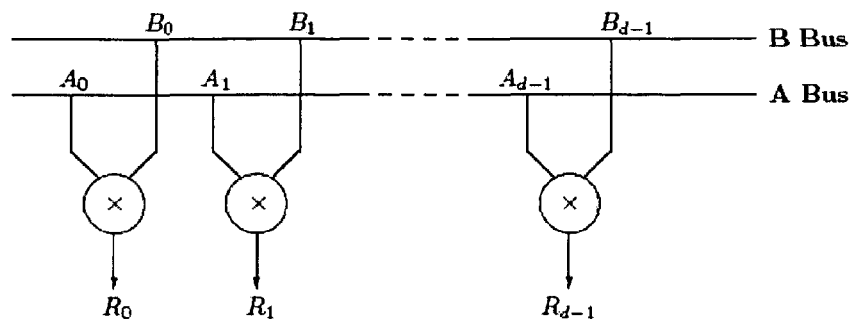
FIG. 8 is a representative architecture for step 1 of SMM, SMM_$2^k$ and SMM_$q^k$
Figure 12:
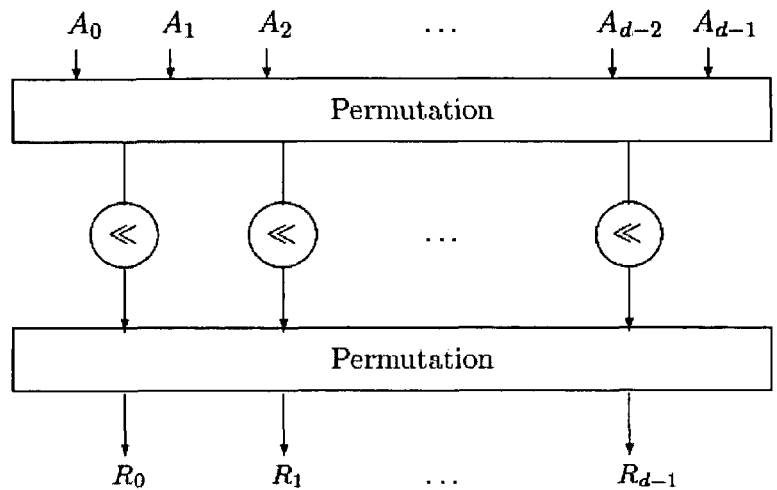
FIG. 12 illustrates squaring used in Step 1 in a Finite Field with ONB.

SMM_$2^k$ over finite fields with f($\gamma$)=AOP(u): The high level architecture for this case has almost the same structure as f($\gamma$)=$\gamma^n$−1 case. Recall that normal basis representation is perfect for squarings. If SMM_$2^k$ method is considered, we can say that the reduction steps has to be performed by using a polynomial representation because of shift-add methodology. In other words it is appropriate to keep the data in polynomial representation except the squaring operation. Therefore the multiplication should be implemented as seen in FIG. 8 but if a squaring operation is emerged a basis conversion should be followed by some circular shift. This can done by some control and conversion logic at Step 1 as seen in FIG. 12.

The architecture for the rest of the reduction loop can be performed as described in FIGS. 10 and 8. Note that if a reduction is needed it is a f(t)=AOP(u) reduction.

Figure 13:
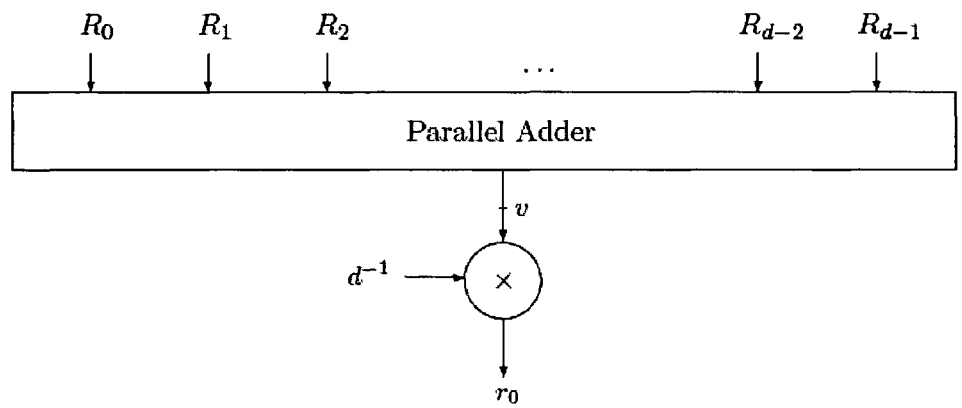
FIG. 13 illustrates partial interpolation for SMM and SMM_$q^k$.

SMM_$q^k$ over a mid-size characteristic ring: Since the characteristic is chosen as a typical wordsize of todays architectures. The GF(q) arithmetic corresponds to usual modular arithmetic on the units. As q is preferred as a Fermat or Mersenne number of the form the form $2^v$±1, the multipliers of Step 1 can be realized by employing v×v modulo multipliers. The complexities of these multipliers are not difficult from the usual integer multiplication. This computation is accomplished using the hardware architecture given in FIG. 13.

Observe that $d^{-1}$ is a constant v-bit number therefore, this can be accomplished using a multi-operand addition.

Whenever d and w are both a power of 2, multiplication by $d^{-1}$ can be replaced with shifts. This can be seen as follows: Let w=$2^l$, and thus, we have $w^d$=$2^{ld}$=1 mod q. We can write $d^{-1}$ as $d^{-1}$=$2^{ld-\log d}$ mod q, hence, multiplication by $d^{-1}$ modulo q can be accomplished with a ld−log d bit circular shift. Therefore, for special Fermat or Mersenne rings, it is possible drop the multiplication by $d^{-1}$ in FIG. 13.

Figure 14:
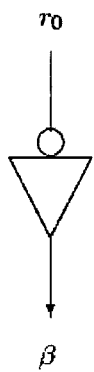
FIG. 14 illustrates PGL for SMM_$q^k$.

The parameter generation and processing engine parts are relatively easier than the ones in SMM_$2^k$ because no carries and overflows exist. In fact we only need a inverter in order to realize this step as seen in FIG. 14.

Figure 15:
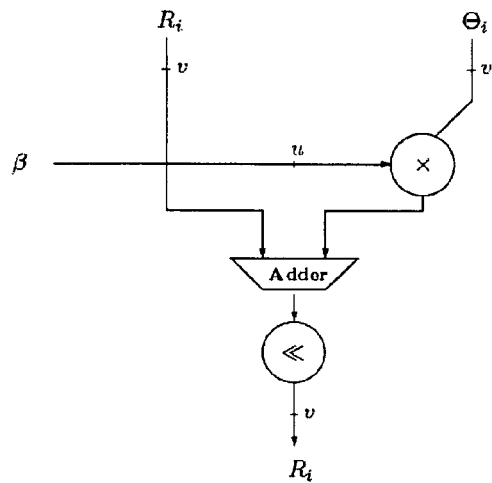
FIG. 15 illustrates a representative processing unit for SMM_$q^k$.

The Processing Engine corresponds to Steps 5 and 6 of SMM_qk method. In FIG. 15, we give the architecture of a single processing unit. The processing engine consists of d such units. The adder in FIG. 15 is modulo q adder. The shift operation is different for each processing unit, unit i shifts $R_i$ circularly by d−1−i where i=1, 2, . . . , d−1.

SMM over an integer ring: observe that SMM architecture is very similar to SMM_$q^k$. However, SMM and SMM_$q^k$ algorithms are quite different. To be specific in SMM we follow a carry save approach because for integer multiplication evaluation of time polynomials gives large integer and coefficients of these polynomials are related. But in case of SMM_$q^k$ coefficients of time polynomials are not related and evaluation do not have any meaning. Keeping these in mind, Step 4 (i.e. Parameter Generation) of SMM corresponds to a partial interpolation and its architecture has given by FIG. 8.

Figure 16:
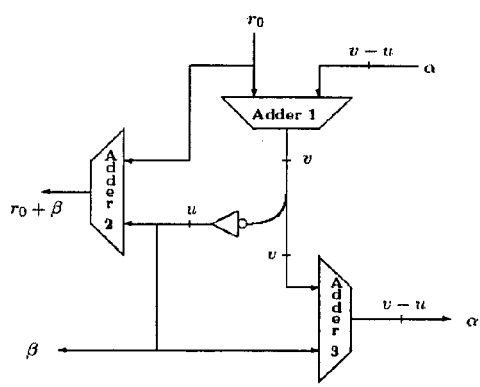
FIG. 16 illustrates PGL for SMM.

The PLG of SMM (i.e. Steps 5 and 6) computes the parameters $r_0$+$\beta$ and $\beta$ can be seen in FIG. 16. The adders seen in FIG. 16 are the usual v-bit adders and they do not need modular reductions since $\alpha$, $(r_0+\alpha)$, $(r_0+\alpha+\beta)<q$.

Figure 17:
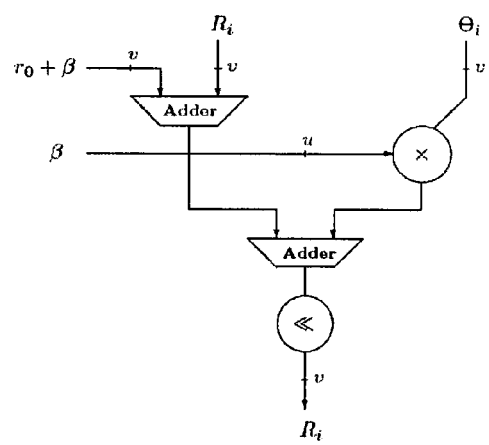
FIG. 17 illustrates a representative processing unit for SMM.

In SMM, the Processing Engine corresponds to Steps 7, 8, and 9. In FIG. 17, we give the architecture of a single processing unit. The whole engine consists of d such units. Note that both adders in FIG. 17 are modulo q adders. The shift operation at the bottom of the figure corresponds to Step 9 of the SMM core. As we pick was a power of 2, the multiplications with the coefficients of $\Gamma(t)$ correspond to the constant $d-1-i$ bit shifts for processing units $R_i$ where $i=1, 2, \ldots, d-1$.

The disclosed methods and apparatus can be used in a variety of cryptographic applications. In most applications, a "message" or other plaintext is encrypted into a ciphertext based on one or more encryption parameters, referred to as keys. The ciphertext can be decrypted into the plaintext based on one or more decryption parameters (keys) which may or may not be the same as those used in encryption. In some examples, one or more of the keys can be made publicly available, so that message intended for a specific recipient can be encrypted based on the public key or keys. However, the public key is inadequate for decryption which must be performed using at least one private key known only to the message recipient. Such systems are referred to a public key cryptographic systems, and tend to reduce the problems associated with key exchange.

One example of such a system is the so-called RSA cryptosystem that is based on exponentiation modulo the product of 2 large primes. Each message recipient has an encryption key that consists of a modulus $n=pq$, wherein p, q are large prime numbers, and an exponent e that is relatively prime with respect to the product $(p-1)(q-1)$. In the RSA encryption method, a message M (a plaintext) is represented as a series of integers, and an encrypted text C (a ciphertext) is produced as $C=M^e \pmod{n}$. The plaintext message can be recovered with a decryption key d that is the inverse of e $(\bmod(p-1)(q-1))$. The message is recovered as $M=C^d \pmod{pq}$. In this system, the public key consists of the pair (n,e) and the private key consists of the pair (n,d). In this system, both encryption and decryption are based on modular exponentiation, and the disclosed methods and apparatus can be used to produce ciphertexts and recover plaintexts from ciphtertexts. Modular exponentiation has similar application in other systems.

In some systems, messages are encrypted using standard symmetric methods in which a message sender and a message recipient share common keys. In such systems, key exchange can be based on public key methods as described above.

6 APPENDIX
TABLE 16

Suitable Fermat rings and the w and d values.

| Ring | Prime Factors | w | d | w | d |
|---|---|---|---|---|---|
| $2^{16}+1$ | 65537 | 4 | 16 | 2 | 32 |
| $2^{20}+1$ | 17 · 61681 | 32 | 8 | 4100 | 16 |
| $2^{24}+1$ | 97 · 257 · 673 | 8 | 16 | $\sqrt{8}$ | 32 |
| $2^{32}+1$ | 641 · 6700417 | 4 | 32 | 2 | 64 |
| $2^{46}+1$ | 257 · 4278255361 | 32 | 16 | $\sqrt{32}$ | 256 |
| $2^{64}+1$ | 274177 · 67280421310721 | 4 | 64 | 2 | 128 |
| $2^{80}+1$ | 414721 · 44479210368001 | 32 | 32 | $\sqrt{32}$ | 1024 |
| $2^{96}+1$ | 641 · 6700417 · 18446744069414584321 | 8 | 64 | $\sqrt{8}$ | 128 |
| $2^{112}+1$ | 449 · 2689 · 65537 · 183076097 · 35842984846099327 | $2^7$ | 32 | $\sqrt{128}$ | 64 |
| $2^{128}+1$ | 59649589127497217 · 5704689200685129054721 | 4 | 128 | 2 | 256 |

TABLE 17

Suitable Mersenne rings and the w and d values.

| Ring | Prime Factors | w | d | w | d |
|---|---|---|---|---|---|
| $2^{17}-1$ | 131071 | 2 | 17 | -2 | 34 |
| $2^{19}-1$ | 524287 | 2 | 19 | -2 | 38 |
| $2^{23}-1$ | 47 · 178481 | 2 | 23 | -2 | 46 |
| $2^{29}-1$ | 233 · 1103 · 2089 | 2 | 29 | -2 | 58 |
| $2^{31}-1$ | 2147483647 | 2 | 31 | -2 | 62 |
| $2^{37}-1$ | 223 · 616318177 | 2 | 37 | -2 | 74 |
| $2^{41}-1$ | 13367 · 164511353 | 2 | 41 | -2 | 82 |
| $2^{43}-1$ | 431 · 9719 · 2099863 | 2 | 43 | -2 | 86 |
| $2^{47}-1$ | 2351 · 4513 · 13264529 | 2 | 47 | -2 | 94 |
| $2^{53}-1$ | 6361 · 69431 · 20394401 | 2 | 53 | -2 | 106 |
| $2^{59}-1$ | 179951 · 3203431780337 | 2 | 59 | -2 | 118 |
| $2^{61}-1$ | 2305843009213693951 | 2 | 61 | -2 | 122 |
| $2^{67}-1$ | 193707721 · 761838257287 | 2 | 67 | -2 | 134 |
| $2^{71}-1$ | 228479 · 48544121 · 212885833 | 2 | 71 | -2 | 142 |
| $2^{73}-1$ | 439 · 2298041 · 9361973132609 | 2 | 73 | -2 | 146 |
| $2^{79}-1$ | 2687 · 202029703 · 1113491139767 | 2 | 79 | -2 | 158 |
| $2^{83}-1$ | 167 · 57912614113275649087721 | 2 | 83 | -2 | 166 |
| $2^{89}-1$ | 618970019642690137449562111 | 2 | 89 | -2 | 178 |
| $2^{97}-1$ | 11447 · 13842607235284485645766393 | 2 | 97 | -2 | 196 |
| $2^{101}-1$ | 7432339208719 · 341117531003194129 | 2 | 101 | -2 | 202 |
| $2^{103}-1$ | 2550183799 · 3976656429941438590393 | 2 | 103 | -2 | 206 |
| $2^{107}-1$ | 162259276829213363391578010288127 | 2 | 107 | -2 | 214 |
| $2^{109}-1$ | 745988807 ? 870035986098720987332873 | 2 | 109 | -2 | 218 |
| $2^{113}-1$ | 3391 · 23279 · 65993 · 1868569 · 1066818132868207 | 2 | 113 | -2 | 226 |
| $2^{127}-1$ | 170141183460469231731687303715884105727 | 2 | 127 | -2 | 254 |

TABLE 18A

Suitable pseudo Fermat rings and the w and d values.

| Ring | Prime Factors | Modulus | w | d | w | d |
|---|---|---|---|---|---|---|
| $2^{17}+1$ | 3 · 43691 | $(2^{17}+1)/3$ | -2,4 | 17 | 2 | 34 |
| $2^{19}+1$ | 3 · 174763 | $(2^{19}+1)/3$ | -2,4 | 19 | 2 | 38 |
| $2^{20}+1$ | 17 · 61681 | $(2^{20}+1)/17$ | 4 | 20 | 2 | 40 |
| $2^{21}+1$ | $3^2$ · 43 · 5419 | $(2^{21}+1)/9$ | -2,4 | 21 | 2 | 42 |
| $2^{22}+1$ | 5 · 397 · 2113 | $(2^{22}+1)/5$ | 4 | 22 | 2 | 44 |
| $2^{23}+1$ | 3 · 2796203 | $(2^{23}+1)/3$ | -2,4 | 23 | 2 | 46 |
| $2^{28}+1$ | 17 · 15790321 | $(2^{28}+1)/17$ | 4 | 28 | 2 | 56 |
| $2^{29}+1$ | 3 · 59 · 3033169 | $(2^{29}+1)/3$ | -2,4 | 29 | 2 | 58 |
| $2^{31}+1$ | 3 · 715827883 | $(2^{31}+1)/3$ | -2,4 | 31 | 2 | 62 |
| $2^{34}+1$ | 5 · 137 · 953 · 26317 | $(2^{34}+1)/5$ | 4 | 34 | 2 | 68 |
| $2^{37}+1$ | 3 · 25781083 · 1777 | $(2^{37}+1)/3$ | -2,4 | 37 | 2 | 74 |
| $2^{38}+1$ | 5 · 229 · 457 · 525313 | $(2^{38}+1)/5$ | 4 | 38 | 2 | 76 |
| $2^{39}+1$ | $3^2$ · 22366891 · 2731 | $(2^{39}+1)/9$ | -2,4 | 39 | 2 | 78 |
| $2^{40}+1$ | 257 · 4278255361 | $(2^{40}+1)/257$ | 4 | 40 | 2 | 80 |
| $2^{41}+1$ | 3 · 83 · 8831418697 | $(2^{41}+1)/3$ | -2,4 | 41 | 2 | 82 |
| $2^{43}+1$ | 3 · 2932031007403 | $(2^{43}+1)/3$ | -2,4 | 43 | 2 | 86 |
| $2^{44}+1$ | 17 · 353 · 2931542417 | $(2^{44}+1)/17$ | 4 | 44 | 2 | 88 |
| $2^{46}+1$ | 5 · 277 · 1013 · 1657 · 30269 | $(2^{46}+1)/5$ | 4 | 46 | 2 | 92 |
| $2^{47}+1$ | 3 · 283 · 165768537521 | $(2^{47}+1)/3$ | -2,4 | 47 | 2 | 94 |
| $2^{52}+1$ | 17 · 308761441 · 858001 | $(2^{52}+1)/17$ | 4 | 52 | 2 | 102 |
| $2^{53}+1$ | 3 · 107 · 28059810762433 | $(2^{53}+1)/3$ | -2,4 | 53 | 2 | 106 |
| $2^{56}+1$ | 257 · 54410972897 · 5153 | $(2^{58}+1)/257$ | 4 | 56 | 2 | 112 |
| $2^{57}+1$ | $3^2$ · 571 · 160465489 · 174763 | $(2^{57}+1)/3$ | -2,4 | 57 | 2 | 114 |
| $2^{58}+1$ | 5 · 107367629 · 536903681 | $(2^{58}+1)/5$ | 4 | 58 | 2 | 116 |
| $2^{59}+1$ | 3 · 1824726041 · 37171 · 2833 | $(2^{59}+1)/3$ | -2,4 | 59 | 2 | 118 |
| $2^{60}+1$ | 17 · 241 · 4562284561 · 61681 | $(2^{60}+1)/17$ | 4 | 60 | 2 | 120 |
| $2^{61}+1$ | 3 · 768614336404564651 | $(2^{61}+1)/3$ | -2,4 | 61 | 2 | 122 |
| $2^{62}+1$ | 5 · 384773 · 49477 · 8681 · 5581 | $(2^{62}+1)/5$ | 4 | 62 | 2 | 124 |
| $2^{65}+1$ | 3 · 11 · 131 · 409891 · 7623851 · 2731 | $(2^{65}+1)/3$ | -2,4 | 65 | 2 | 130 |

TABLE 18B

Suitable pseudo Fermat rings and the w and d values.

| Ring | Prime Factors | Modulus | w | d | w | d |
|---|---|---|---|---|---|---|
| $2^{66} + 1$ | 5 · 13 · 397 · 4327489 · 312709 · 2113 | $(2^{66} + 1)/5$ | 4 | 66 | 2 | 132 |
| $2^{67} + 1$ | 3 · 6713103182899 · 7327657 | $(2^{67} + 1)/3$ | −2, 4 | 67 | 2 | 134 |
| $2^{68} + 1$ | $17^2$ · 2879347902817 · 354689 | $(2^{68} + 1)/172$ | 4 | 68 | 2 | 136 |
| $2^{71} + 1$ | 3 · 56409643 · 13952598148481 | $(2^{71} + 1)/3$ | −2, 4 | 71 | 2 | 142 |
| $2^{73} + 1$ | 3 · 1795918038741070627 · 1753 | $(2^{73} + 1)/3$ | −2, 4 | 73 | 2 | 146 |
| $2^{74} + 1$ | 5 · 149 · 593 · 184481113 · 231769777 | $(2^{74} + 1)/5$ | 4 | 74 | 2 | 148 |
| $2^{76} + 1$ | 17 · 1217 · 24517014940753 · 148961 | $(2^{76} + 1)/17$ | 4 | 76 | 2 | 152 |
| $2^{79} + 1$ | 3 · 201487636602438195784363 | $(2^{79} + 1)/3$ | −2, 4 | 79 | 2 | 158 |
| $2^{82} + 1$ | 5 · 181549 · 12112549 · 43249589 · 10169 | $(2^{82} + 1)/5$ | 4 | 82 | 2 | 164 |
| $2^{83} + 1$ | 3 · 499 · 1163 · 13455809771 · 155377 · 2657 | $(2^{83} + 1)/3$ | −2, 4 | 83 | 2 | 166 |
| $2^{85} + 1$ | 3 · 11 · 26831423036065352611 · 43691 | $(2^{85} + 1)/33$ | −2, 4 | 85 | 2 | 170 |
| $2^{86} + 1$ | 5 · 173 · 1759217765581 · 500177 · 101653 | $(2^{86} + 1)/5$ | 4 | 86 | 2 | 172 |
| $2^{87} + 1$ | $3^2$ · 59 · 96076791871613611 · 3033169 | $(2^{87} + 1)/531$ | −2, 4 | 87 | 2 | 174 |
| $2^{88} + 1$ | 257 · 43872038849 · 119782433 · 229153 | $(2^{88} + 1)/257$ | 4 | 88 | 2 | 176 |
| $2^{89} + 1$ | 3 · 179 · 18584774046020617 · 62020897 | $(2^{89} + 1)/3$ | −2, 4 | 89 | 2 | 178 |
| $2^{91} + 1$ | 3 · 43 · 25829691707 · 1210483 · 2731 · 224771 | $(2^{91} + 1)/129$ | −2, 4 | 91 | 2 | 182 |
| $2^{92} + 1$ | 17 · 29128000924361888821155864 | $(2^{92} + 1)/17$ | 4 | 92 | 2 | 184 |
| $2^{93} + 1$ | $3^2$ · 529510939 · 2903110321 · 715827883 | $(2^{93} + 1)/9$ | −2, 4 | 93 | 2 | 186 |
| $2^{94} + 1$ | 5 · 7484047069 · 1407374715788113 · 31817 | $(2^{94} + 1)/5$ | 4 | 94 | 2 | 188 |
| $2^{96} + 1$ | 641 · 18446744069414584321 · 6700417 | $(2^{96} + 1)/641$ | 4 | 96 | 2 | 192 |
| $2^{97} + 1$ | 3 · 971 · 1553 · 1100876018364883721 · 31817 | $(2^{97} + 1)/3$ | −2, 4 | 97 | 2 | 194 |
| $2^{101} + 1$ | 3 · 845100400152152934331135470251 | $(2^{101} + 1)/3$ | −2, 4 | 101 | 2 | 202 |
| $2^{103} + 1$ | 3 · 8142767081771726171 · 415141630193 | $(2^{103} + 1)/3$ | −2, 4 | 103 | 2 | 206 |
| $2^{104} + 1$ | 257 · 78919881726271091143763623681 | $(2^{104} + 1)/257$ | 4 | 104 | 2 | 208 |
| $2^{106} + 1$ | 5 · 15358129 · 586477649 · 1801439824104653 | $(2^{106} + 1)/5$ | 4 | 106 | 2 | 212 |
| $2^{107} + 1$ | 3 · 8411574744904788148863556780 | $(2^{107} + 1)/3$ | −2, 4 | 107 | 2 | 214 |
| $2^{109} + 1$ | 3 · 2077756847362348863128179 · 104124649 | $(2^{109} + 1)/3$ | −2, 4 | 109 | 2 | 218 |

TABLE 18C

Suitable pseudo Fermat rings and the w and d values.

| Ring | Prime Factors | Modulus | w | d | w | d |
|---|---|---|---|---|---|---|
| $2^{111} + 1$ | $3^2$ · 1777 · 3331 · 17539 · 25781083 · 107775231312019 | $(2^{111} + 1)/9$ | −2, 4 | 111 | 2 | 222 |
| $2^{113} + 1$ | 3 · 227 · 48817 · 636190001 · 4910033693446604 09 | $(2^{113} + 1)/3$ | −2, 4 | 113 | 2 | 226 |
| $2^{114} + 1$ | 5 · 13 · 229 · 457 · 131101 · 160969 · 525313 · 275415303169 | $(2^{114} + 1)/65$ | −2, 4 | 114 | 2 | 228 |
| $2^{116} + 1$ | 17 · 59393 · 82280195167144119832390568177 | $(2^{116} + 1)/17$ | 4 | 116 | 2 | 232 |
| $2^{118} + 1$ | 5 · 1181 · 3541 · 157649 · 174877 · 5521693 · 104399276341 | $(2^{118} + 1)/5$ | −2, 4 | 118 | 2 | 236 |
| $2^{120} + 1$ | 97 · 257 · 673 · 394783681 · 46908728641 · 4278255361 | $(2^{120} + 1)/257$ | 32 | 48 | $\sqrt{32}$ | 96 |
| $2^{121} + 1$ | 3 · 683 · 117371 · 11054184582797800455736061107 | $(2^{121} + 1)/4098$ | −2, 4 | 121 | 2 | 242 |
| $2^{122} + 1$ | 5 · 733 · 1709 · 3456749 · 8831418697 · 13194317913029593 | $(2^{122} + 1)/5$ | 4 | 122 | 2 | 244 |
| $2^{123} + 1$ | $3^2$ · 83 · 739 · 165313 · 8831418697 · 13194317913029593 | $(2^{123} + 1)/747$ | −2, 4 | 123 | 2 | 146 |
| $2^{124} + 1$ | 17 · 290657 · 3770202641 · 1141629180401976895873 | $(2^{124} + 1)/17$ | 4 | 124 | 2 | 248 |
| $2^{127} + 1$ | 3 · 56713727820156410577229101238628035243 | $(2^{127} + 1)/3$ | −2, 4 | 127 | 2 | 254 |

TABLE 19A

Suitable pseudo Mersenne rings and the w and d values.

| Ring | Prime Factors | Modulus | w | d | w | d |
|---|---|---|---|---|---|---|
| $2^{25} − 1$ | 31 · 601 · 1801 | $(2^{25} − 1)/31$ | 2 | 25 | −2 | 50 |
| $2^{26} − 1$ | 3 · 2731 · 8191 | $(2^{26} − 1)/3$ | 2 | 26 | −2 | 52 |
| $2^{27} − 1$ | 7 · 73 · 262657 | $(2^{27} − 1)/511$ | 2 | 27 | −2 | 54 |
| $2^{34} − 1$ | 3 · 43691 · 131071 | $(2^{34} − 1)/3$ | 2 | 34 | −2 | 68 |
| $2^{35} − 1$ | 31 · 71 · 127 · 122921 | $(2^{35} − 1)/3937$ | 2 | 35 | −2 | 70 |
| $2^{38} − 1$ | 3 · 174763 · 524287 | $(2^{38} − 1)/3$ | 2 | 38 | −2 | 76 |
| $2^{39} − 1$ | 7 · 79 · 8191 · 121369 | $(2^{39} − 1)/7$ | 2 | 39 | −2 | 78 |

TABLE 19A-continued

Suitable pseudo Mersenne rings and the w and d values.

| Ring | Prime Factors | Modulus | w | d | w | d |
|---|---|---|---|---|---|---|
| $2^{46} - 1$ | $3 \cdot 47 \cdot 178481 \cdot 2796203$ | $(2^{46} - 1)/3$ | 2 | 46 | 4 | 23 |
| $2^{49} - 1$ | $127 \cdot 4432676798593$ | $(2^{49} - 1)/127$ | 2 | 49 | −2 | 98 |
| $2^{51} - 1$ | $7 \cdot 103 \cdot 2143 \cdot 11119 \cdot 131071$ | $(2^{51} - 1)/7$ | 2 | 51 | −2 | 102 |
| $2^{57} - 1$ | $7 \cdot 32377 \cdot 524287 \cdot 1212847$ | $(2^{57} - 1)/7$ | 2 | 57 | −2 | 114 |
| $2^{58} - 1$ | $3 \cdot 59 \cdot 233 \cdot 1103 \cdot 2089 \cdot 3033169$ | $(2^{58} - 1)/3$ | 2 | 58 | 4 | 29 |
| $2^{62} - 1$ | $3 \cdot 715827883 \cdot 2147483647$ | $(2^{62} - 1)/3$ | 2 | 62 | −2 | 124 |
| $2^{64} - 1$ | $3 \cdot 5 \cdot 17 \cdot 257 \cdot 641 \cdot 65537 \cdot 6700417$ | $(2^{64} - 1)/255$ | 2 | 64 | −2 | 128 |
| $2^{65} - 1$ | $31 \cdot 8191 \cdot 145295143558111$ | $(2^{65} - 1)/31$ | 2 | 65 | −2 | 130 |
| $2^{74} - 1$ | $3 \cdot 223 \cdot 1777 \cdot 25781083 \cdot 616318177$ | $(2^{74} - 1)/3$ | 2 | 74 | −2 | 148 |
| $2^{75} - 1$ | $7 \cdot 31 \cdot 151 \cdot 601 \cdot 1801 \cdot 100801 \cdot 10567201$ | $(2^{75} - 1)/217$ | 2 | 75 | −2 | 150 |
| $2^{78} - 1$ | $3^2 \cdot 7 \cdot 79 \cdot 2731 \cdot 8191 \cdot 121369 \cdot 22366891$ | $(2^{78} - 1)/63$ | 2 | 78 | 4 | 39 |
| $2^{82} - 1$ | $3 \cdot 83 \cdot 13367 \cdot 164511353 \cdot 8831418697$ | $(2^{82} - 1)/3$ | 2 | 82 | 4 | 41 |
| $2^{85} - 1$ | $31 \cdot 131071 \cdot 9520972806333758431$ | $(2^{85} - 1)/31$ | 2 | 85 | −2 | 170 |
| $2^{86} - 1$ | $3 \cdot 431 \cdot 9719 \cdot 2099863 \cdot 2932031007403$ | $(2^{86} - 1)/3$ | 2 | 86 | 4 | 43 |
| $2^{91} - 1$ | $127 \cdot 911 \cdot 8191 \cdot 112901153 \cdot 23140471537$ | $(2^{91} - 1)/127$ | 2 | 91 | −2 | 182 |
| $2^{93} - 1$ | $7 \cdot 2147483647 \cdot 658812288653553079$ | $(2^{93} - 1)/7$ | 2 | 93 | −2 | 186 |
| $2^{94} - 1$ | $3 \cdot 283 \cdot 2351 \cdot 4513 \cdot 13264529 \cdot 165768537521$ | $(2^{94} - 1)/3$ | 2 | 94 | 4 | 47 |
| $2^{106} - 1$ | $3 \cdot 107 \cdot 6361 \cdot 69431 \cdot 20394401 \cdot 28059810762433$ | $(2^{106} - 1)/3$ | 2 | 106 | 4 | 53 |

TABLE 19B

Suitable pseudo Mersenne rings and the w and d values.

| Ring | Prime Factors | Modulus | w | d | w | d |
|---|---|---|---|---|---|---|
| $2^{111} - 1$ | $7 \cdot 223 \cdot 321679 \cdot 26295457 \cdot 616318177 \cdot 319020217$ | $(2^{111} - 1)/7$ | 2 | 111 | −2 | 222 |
| $2^{114} - 1$ | $3^2 \cdot 7 \cdot 571 \cdot 32377 \cdot 174763 \cdot 524287 \cdot 1212847 \cdot 160465489$ | $(2^{114} - 1)/63$ | 2 | 114 | 4 | 57 |
| $2^{115} - 1$ | $31 \cdot 47 \cdot 14951 \cdot 178481 \cdot 4036961 \cdot 2646507710984041$ | $(2^{115} - 1)/1457$ | 2 | 115 | −2 | 230 |
| $2^{118} - 1$ | $3 \cdot 2833 \cdot 37171 \cdot 179951 \cdot 1824726041 \cdot 3203431780337$ | $(2^{118} - 1)/3$ | 2 | 118 | 4 | 59 |
| $2^{121} - 1$ | $23 \cdot 89 \cdot 727 \cdot 1786393878363164227858270210279$ | $(2^{121} - 1)/2047$ | 2 | 121 | −2 | 242 |
| $2^{122} - 1$ | $3 \cdot 768614336404564651 \cdot 2305843009213693951$ | $(2^{122} - 1)/3$ | 2 | 122 | −2 | 244 |
| $2^{128} - 1$ | $3 \cdot 5 \cdot 17 \cdot 257 \cdot 641 \cdot 65537 \cdot 274177 \cdot 6700417 \cdot 67280421310721$ | $(2^{128} - 1)/255$ | 2 | 128 | 4 | 64 |

TABLE 20

Parameter selection by using CRT for SME with SMM.

| Bits k | Ring $\mathbb{Z}_q$ | | DFT d | Root w | Words s | Wordsize u |
|---|---|---|---|---|---|---|
| 518 | q1 | $2^{37} - 1$ | 74 | −2 | 37 | 14 |
| | q2 | $(2^{37} + 1)/3$ | 74 | 2 | 37 | |
| 1,071 | q1 | $(2^{51} - 1)/7$ | 102 | −2 | 51 | 21 |
| | q2 | $2^{53} - 1$ | 106 | −2 | 53 | |
| 2,130 | q1 | $(2^{71} - 1)$ | 141 | −2 | 71 | 30 |
| | q2 | $(2^{71} + 1)/3$ | 141 | 2 | 71 | |
| 4,171 | q1 | $(2^{97} - 1)$ | 194 | −2 | 97 | 43 |
| | q2 | $(2^{97} + 1)/3$ | 194 | 2 | 97 | |

TABLE 21A

Improved parameter selection by using CRT for SME.

| Bits k | Ring $\mathbb{Z}_q$ | | DFT d | Root w | Words s | Wordsize u |
|---|---|---|---|---|---|---|
| 512 | q1 | $2^{16} + 1$ | 32 | 2 | 16 | 32 |
| | q2 | $2^{17} - 1$ | 34 | −2 | 17 | |
| | q3 | $(2^{17} + 1)/3$ | 34 | 2 | 17 | |
| | q4 | $2^{19} - 1$ | 38 | −2 | 19 | |
| | q5 | $(2^{20} + 1)$ | 40 | 2 | 20 | |
| 551 | q1 | $2^{29} - 1$ | 58 | −2 | 29 | 19 |
| | q2 | $2^{31} - 1$ | 62 | −2 | 31 | |
| 560 | q1 | $2^{31} - 1$ | 32 | 2 | 16 | 35 |
| | q2 | $(2^{31} + 1)/3$ | 32 | −2 | 16 | |
| | q3 | $2^{32} + 1$ | 32 | 4 | 16 | |
| 1,054 | q1 | $2^{31} - 1$ | 62 | −2 | 31 | 34 |
| | q2 | $(2^{31} + 1)/3$ | 62 | 2 | 31 | |
| | q3 | $2^{32} + 1$ | 64 | 2 | 32 | |
| 1,148 | q1 | $2^{41} - 1$ | 82 | −2 | 41 | 28 |
| | q2 | $(2^{41} + 1)/3$ | 82 | 2 | 41 | |
| 2,015 | q1 | $2^{31} - 1$ | 62 | −2 | 31 | 65 |
| | q2 | $(2^{31} + 1)/3$ | 62 | 2 | 31 | |
| | q3 | $2^{32} + 1$ | 64 | 2 | 32 | |
| | q4 | $2^{64} + 1$ | 64 | 2 | 32 | |
| 2,052 | q1 | $2^{71} - 1$ | 71 | 2 | 36 | 57 |
| | q2 | $(2^{71} + 1)/3$ | 71 | −2 | 36 | |
| 2,067 | q1 | $2^{53} - 1$ | 106 | −2 | 53 | 39 |
| | q2 | $(2^{53} + 1)/3$ | 106 | 2 | 53 | |

TABLE 21B

Improved parameter selection by using CRT for SME.

| Bits k | Ring $\mathbb{Z}_q$ | DFT d | Root w | Words s | Wordsize u |
|---|---|---|---|---|---|
| 4,118 | q1 | $(2^{58}+1)/5$ | 116 | 2 | 58 | 71 |
|  | q2 | $2^{59}-1$ | 118 | -2 | 59 |  |
|  | q3 | $(2^{59}+1)/3$ | 118 | 2 | 59 |  |
| 4,161 | q1 | $2^{73}-1$ | 146 | -2 | 73 | 57 |
|  | q2 | $(2^{73}+1)/3$ | 146 | 2 | 73 |  |
| 8,216 | q1 | $2^{79}-1$ | 158 | -2 | 79 | 104 |
|  | q2 | $(2^{79}+1)/5$ | 158 | 2 | 79 |  |
|  | q3 | $2^{83}-1$ | 166 | -2 | 83 |  |
| 8,357 | q1 | $2^{61}-1$ | 122 | -2 | 61 | 137 |
|  | q2 | $(2^{61}+1)/3$ | 122 | 2 | 61 |  |
|  | q3 | $(2^{62}+1)/5$ | 124 | 2 | 62 |  |
|  | q4 | $2^{62}+4$ | 128 | 2 | 64 |  |
|  | q5 | $(2^{64}-1)/31$ | 130 | -2 | 65 |  |
| 8,484 | q1 | $2^{101}-1$ | 202 | -2 | 101 | 84 |
|  | q2 | $(2^{101}+1)/3$ | 202 | 2 | 101 |  |
| 16,428 | q1 | $(2^{111}-1)/7$ | 222 | -2 | 111 | 148 |
|  | q2 | $(2^{111}+1)/9$ | 222 | 2 | 111 |  |
|  | q3 | $2^{113}-1$ | 226 | -2 | 113 |  |
| 16,827 | q1 | $2^{71}-1$ | 142 | -2 | 71 | 237 |
|  | q2 | $2^{73}-1$ | 146 | -2 | 73 |  |
|  | q3 | $(2^{74}+1)/5$ | 148 | 4 | 74 |  |
|  | q4 | $(2^{75}-1)/217$ | 150 | -2 | 75 |  |
|  | q5 | $(2^{76}+1)/17$ | 152 | 4 | 76 |  |
|  | q6 | $2^{79}-1$ | 158 | -2 | 79 |  |
|  | q7 | $(2^{79}+1)/3$ | 158 | 2 | 79 |  |

REFERENCES

[1] R. E. Blahut. *Fast Algorithms for Digital Signal Processing*, Chapter 6, Addison-Wesley Publishing Company, 1985.

[2] A. Halbutogullari and Ç. K. Koç. Mastrovito multiplier for general irreducible polynomials. *IEEE Transactions on Computers*, 49(5):503-518, May 2000.

[3] Ç. K. Koç. High-Speed RSA Implementation. TR 201, RSA Laboratories, 73 pages, November 1994.

[4] Ç. K. Koç. RSA Hardware Implementation. TR 801, RSA Laboratories, 30 pages, April 1996.

[5] H. J. Naussbaumer. *Fast Fourier Transform and Convolution Algorithms*, Chapter 8, Springer, Berlin, Germany, 1982.

[6] J. M. Pollard. The fast Fourier transform in a finite field. *Mathematics of Computation*, vol. 25, pp. 365-374, 1971.

[7] A. V. Aho, J. E. Hoperoft and J. D. Ullman. *The Design and Analysis of Computer Algorithms*, Chapter 7, Addison-Wesley Publishing Company, 1974.

[8] A. Schönhage and V. Strassen, "Schnelle multiplikation grafer zahlen," *Computing*, vol. 7, pp. 281-292, 1971.

As shown above, the disclosed methods and apparatus have numerous applications in secure communications and message authentication. A variety of numerical parameters are used include numerical representations of messages (both plaintext and ciphertext), keys, signatures, modulus, and other parameters. For convenience, these parameters can be referred to as cryptographic parameters. SMM as described herein can be used with structures for which modular multiplication is necessary, such as, for example, $GF(q^k)$, q prime, or finite rings in general. SMM can be used in any operation possible with such structures such as, for example, exponentiation over $Z_n$, elliptic point addition over $GF(q^k)$, hyperelliptic curve addition, pairings or other operation over a polynomial ring $Z[t]/(f(t))$, or operations with p-adic numbers. In some examples, modular arithmetic operations are described with reference to operations on integer representations of cryptographic parameters. This is for convenience only, and modular operations are similarly configured for operations in which representations of cryptographic parameters are based on polynomial or other representations.

In some examples, modular products of operands x and y are obtained based on a product of xy. In other examples, such modular products are based on a product $xyr^{-d}$, wherein d is an integer. Such modular products are typically used in so-called Montgomery products or Montgomery reductions. Modular reductions of either are referred to herein as modular produces of x and y.

The methods disclosed herein can be implemented in software as computer executable instructions, or can be implemented in dedicated or adapted hardware such as application specific integrated circuits (ASICs) or other hardware cryptographic processor. Computer executable instructions can be stored in RAM, ROM, on hard disk, floppy disk, CD, DVD or other storage medium as convenient.

In view of the many possible embodiments to which the principles of the disclosed technology may be applied, it should be recognized that the illustrated embodiments are only preferred examples of the and should not be taken as limiting the scope of the technology. Rather, the scope of the invention is defined by the following claims. We therefore claim as our invention all that comes within the scope and spirit of these claims.

We claim:

1. A method of modular exponentiation, comprising:
   at a cryptographic processor, receiving a message text m, an exponent e, and a modulus n, represented as a number of words s;
   determining a $v_0$ multiple of the modulus n, representing the $v_0$ multiple of the modulus n as a polynomial θ, and obtaining a Fourier transform of the polynomial θ, wherein $v_0$ is an inverse of a least significant word of n modulus $b=2^u$, and u is a word length;
   obtaining a Fourier transform Δ of a polynomial representation δ associated with a square of a Montgomery coefficient modulo n;
   obtaining a polynomial representation M of a Fourier transform of the message text m;
   performing exponentiation of M in the Fourier transform domain by a series of j spectral modular multiplications to obtain a transform domain representation, wherein j is a number of bits in the exponent e; and
   obtaining an inverse Fourier transform of the transform domain representation to obtain an integer associated with $m^e$ (mod n).

2. A modular multiplication method, comprising:
   at a cryptographic processor, receiving first and second cryptographic parameters a and b, and a ring parameter q;
   determining Fourier transforms A, B of the first and second parameters a, b, respectively, based on polynomial representations of the first and second parameters;
   determining a component wise modular product R of the Fourier transforms of A, B with respect to a modulus q;
   determining a $v_0$ multiple of a modulus n, representing the $v_0$ multiple of the modulus n as a polynomial θ, and obtaining a Fourier transform of the polynomial θ, wherein $v_0$ is an inverse of a least significant word of n modulus $b=2^u$, and u is a word length;
   iteratively processing the modular product R based on a Fourier transform of the polynomial θ and component-wise modular products with a vector based on a principal root of unity with respect to the modulus q; and
   outputting the modular product R of the last iteration.

3. A non-transitory computer readable medium, comprising computer-executable instructions for a method of modular exponentiation, comprising:

at a cryptographic processor, receiving a message text m, an exponent e, and a modulus n, represented as a number of words s;

determining a $v_0$ multiple of the modulus n, representing the $v_0$ multiple of the modulus n as a polynomial θ, and obtaining a Fourier transform of the polynomial θ, wherein $v_0$ is an inverse of a least significant word of n modulus $b=2^u$, and u is a word length;

obtaining a Fourier transform Δ of a polynomial representation δ associated with a square of a Montgomery coefficient modulo n;

obtaining a polynomial representation M of a Fourier transform of the message text m;

performing exponentiation of M in the Fourier transform domain by a series of j spectral modular multiplications to obtain a transform domain representation, wherein j is a number of bits in the exponent e; and obtaining an inverse Fourier transform of the transform domain representation to obtain an integer associated with $m^e$ (mod n).

* * * * *